(12) United States Patent
Gupta et al.

(10) Patent No.: US 11,100,554 B1
(45) Date of Patent: Aug. 24, 2021

(54) SYSTEM, METHOD AND COMPUTER PROGRAM PRODUCT FOR PROVIDING THEMATIC LANDING PAGES

(71) Applicant: BloomReach Inc., Mountain View, CA (US)

(72) Inventors: Mohit Gupta, Mountain View, CA (US); Fei Chen, Mountain View, CA (US); Fei Xie, Pleasanton, CA (US); Shao-Chuan Wang, Santa Clara, CA (US); Vache Moroyan, San Mateo, CA (US); Ashutosh Garg, Sunnyvale, CA (US); Stormy Shippy, Palo Alto, CA (US); Wally Ye, Redwood City, CA (US); Ramkumar Rajendran, Cupertino, CA (US)

(73) Assignee: BloomReach Inc., Mountainview, CA (US)

( * ) Notice: Subject to any disclaimer, the term of this patent is extended or adjusted under 35 U.S.C. 154(b) by 554 days.

(21) Appl. No.: 14/656,536

(22) Filed: Mar. 12, 2015

Related U.S. Application Data

(60) Provisional application No. 61/952,363, filed on Mar. 13, 2014.

(51) Int. Cl.
*G06Q 30/06* (2012.01)
*G06F 16/9535* (2019.01)

(52) U.S. Cl.
CPC ..... *G06Q 30/0625* (2013.01); *G06F 16/9535* (2019.01); *G06Q 30/06* (2013.01); *G06Q 30/0641* (2013.01)

(58) Field of Classification Search
CPC ............. G06Q 30/0625; G06Q 30/0601–0645

USPC .............................................. 705/26.1–27.2
See application file for complete search history.

(56) References Cited

U.S. PATENT DOCUMENTS

| | | |
|---|---|---|
| 5,894,554 A | 4/1999 | Lowery et al. |
| 6,990,653 B1 | 1/2006 | Burd et al. |
| 7,096,418 B1 | 8/2006 | Singhal et al. |
| 7,275,114 B2 | 9/2007 | Allen et al. |
| 7,316,003 B1 | 1/2008 | Dulepet et al. |
| 7,386,786 B2 | 6/2008 | Davis et al. |
| 7,398,463 B2 | 7/2008 | Bernstein et al. |

(Continued)

FOREIGN PATENT DOCUMENTS

| | | |
|---|---|---|
| EP | 1156429 | 11/2001 |
| WO | 0188762 | 11/2001 |

OTHER PUBLICATIONS

Jill Kocher Brown, "Bloomreach to change SEO technology", Feb. 12, 2012, PracticalEcommerce (Year: 2012).*

(Continued)

*Primary Examiner* — Allison G Wood
*Assistant Examiner* — Jason B Warren
(74) *Attorney, Agent, or Firm* — Moser Taboada

(57) ABSTRACT

Techniques for thematic landing pages are disclosed. In some embodiments, a process for providing thematic landing pages includes receiving a user query for a theme; determining products (e.g., using a processor) that are relevant to the theme (e.g., based on a content relevancy); and generating a thematic web page for the theme based on the relevant products. For example, the thematic landing page can be associated with a merchant web site, and the relevant products can be products that are available via the merchant web site.

20 Claims, 14 Drawing Sheets

(56) References Cited

U.S. PATENT DOCUMENTS

| | | | |
|---|---|---|---|
| 7,437,663 B2 | 10/2008 | Lakhdhir et al. | |
| 7,536,389 B1 | 5/2009 | Prabhakar et al. | |
| 7,797,432 B2 | 9/2010 | Volodarsky et al. | |
| 7,818,399 B1 * | 10/2010 | Ross, Jr. | G06Q 30/06 709/215 |
| 8,166,054 B2 | 4/2012 | Fu | |
| 8,225,196 B2 | 7/2012 | Ramakrishna | |
| 8,230,053 B2 | 7/2012 | Allen | |
| 8,539,330 B2 | 9/2013 | Dovin | |
| 8,606,652 B2 * | 12/2013 | Gonsalves | G06Q 30/0631 705/26.1 |
| 9,390,180 B1 | 7/2016 | Snyder | |
| 2005/0076097 A1 | 4/2005 | Sullivan et al. | |
| 2005/0102611 A1 | 5/2005 | Chen | |
| 2008/0133722 A1 | 6/2008 | Ramasundaram et al. | |
| 2008/0282176 A1 | 11/2008 | Bates et al. | |
| 2009/0006311 A1 * | 1/2009 | Ting | G06F 16/951 |
| 2009/0171754 A1 * | 7/2009 | Kane | G06F 17/30867 705/14.53 |
| 2009/0192783 A1 | 7/2009 | Jurach, Jr. et al. | |
| 2011/0054960 A1 | 3/2011 | Bhatia et al. | |
| 2011/0307517 A1 * | 12/2011 | Ntoulas | G06F 17/30451 707/780 |
| 2015/0095202 A1 * | 4/2015 | Subramanya | G06Q 10/087 705/28 |

OTHER PUBLICATIONS

Amza et al., Specification and Implementation of Dynamic Web Site Benchmarks,Workload Characterization, 2002. WWC-5. 2002 IEEE International Workshop on. IEEE, 2002.

Challenger et al., A Scalable System of Consistently Caching Dynamic Web Data, IEEE, 1999.

Challenger et al., A Publishing System for Efficiently Creating Dynamic Web Content, INFOCOM 2000. Nineteenth Annual Joint Conference of the IEEE Computer and Communications Societies. Proceedings. IEEE. vol. 2. IEEE, 2000.

Jim Conallen, Modeling Web Application Architectures with UML, Rational Software White Papers, Jun. 1999.

Maximilien et al., A Framework and Ontology for Dynamic Web Services Selection, IEEE, Sep./Oct. 2004.

Macias et al., Dynamic Web Page Authoring by Example Using Ontology-Based Domain Knowledge, Jan. 12-15, 2003.

Artzi et al., Computer Science and Artificial Intelligence Laboratory Technical Report, Finding Bugs in Dynamic Web Applications, Feb. 6, 2008.

Oney et al., FireCystal: Understanding Interactive Behaviors in Dynamic Web Pages, IEEE, 2009.

* cited by examiner

SYSTEM, METHOD AND COMPUTER PROGRAM PRODUCT FOR PROVIDING THEMATIC LANDING PAGES

CROSS REFERENCE TO OTHER APPLICATIONS

This application claims priority to U.S. Provisional Patent Application No. 61/952,363, entitled LANDING PAGE MANAGER filed Mar. 13, 2014, which is incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Internet-based web services can be delivered through web sites on the World Wide Web. Web pages are often formatted using HyperText Markup Language (HTML), eXtensible HTML (XHTML), or using another language that can be processed by a web browser that is typically executed on a user's client device, such as a computer, tablet, phablet, smart phone, smart watch, smart television, or other (client) device. A web site can be hosted on a web server (e.g., a web server or appliance) that is typically accessible via a network, such as the Internet, through a web address, which is generally known as a Uniform Resource Indicator (URI) or a Uniform Resource Locator (URL).

Search engines can be used to facilitate searching of web services, such as to identify relevant web sites for particular online content and/or services on the World Wide Web. Search engines (e.g., web-based search engines provided by various vendors, including, for example, Google®, Microsoft Bing®, and Yahoo®) provide for searches of online information that includes searchable content (e.g., digitally stored electronic data), such as searchable content available via the World Wide Web. As input, a search engine typically receives a search query (e.g., query input including one or more terms, such as keywords, by a user of the search engine). The search engine performs the search for the search query and outputs results that are typically presented in a ranked list, often referred to as search results or hits (e.g., links or URIs/URLs for one or more web pages and/or web sites). The search results can include web pages, images, audio, video, database results, directory results, information, and other types of data.

Search engines typically provide paid search results (e.g., the first set of results in the main listing and/or results often presented in a separate listing on, for example, the right side of the output screen). For example, advertisers may pay for placement in such paid search results based on keywords (e.g., keywords in search queries). Search engines also typically provide organic search results, also referred to as natural search results. Organic search results are generally based on various search algorithms employed by different search engines that attempt to provide relevant search results based on a received search query.

For improved Internet marketing, search engine optimization (SEO) has developed as a form of industry/technical consulting (e.g., often referred to as search engine optimizers) provided to web site operators (e.g., vendors of products/services with web sites and/or e-commerce vendors of products/services) for improving the volume or quality of traffic to a web site from a search engine via organic search results (e.g., to improve the web site's web presence as a paid service engagement or pursuant to a marketing campaign). Generally, the higher a web site appears in the organic search results list, the more, users it will receive from the search engine. SEO can target different kinds of search, including image search, local search, and industry specific, vertical search engines to improve the web site's web presence. For example, SEO often considers how search engines work and what people search for to recommend web site related changes to optimize a web site (e.g., which primarily involves editing its content and HTML coding to both increase its relevance to specific keywords and to remove barriers to the indexing activities of search engines).

BRIEF DESCRIPTION OF THE DRAWINGS

Various embodiments of the invention are disclosed in the following detailed description and the accompanying drawings.

DETAILED DESCRIPTION

Figure 1:
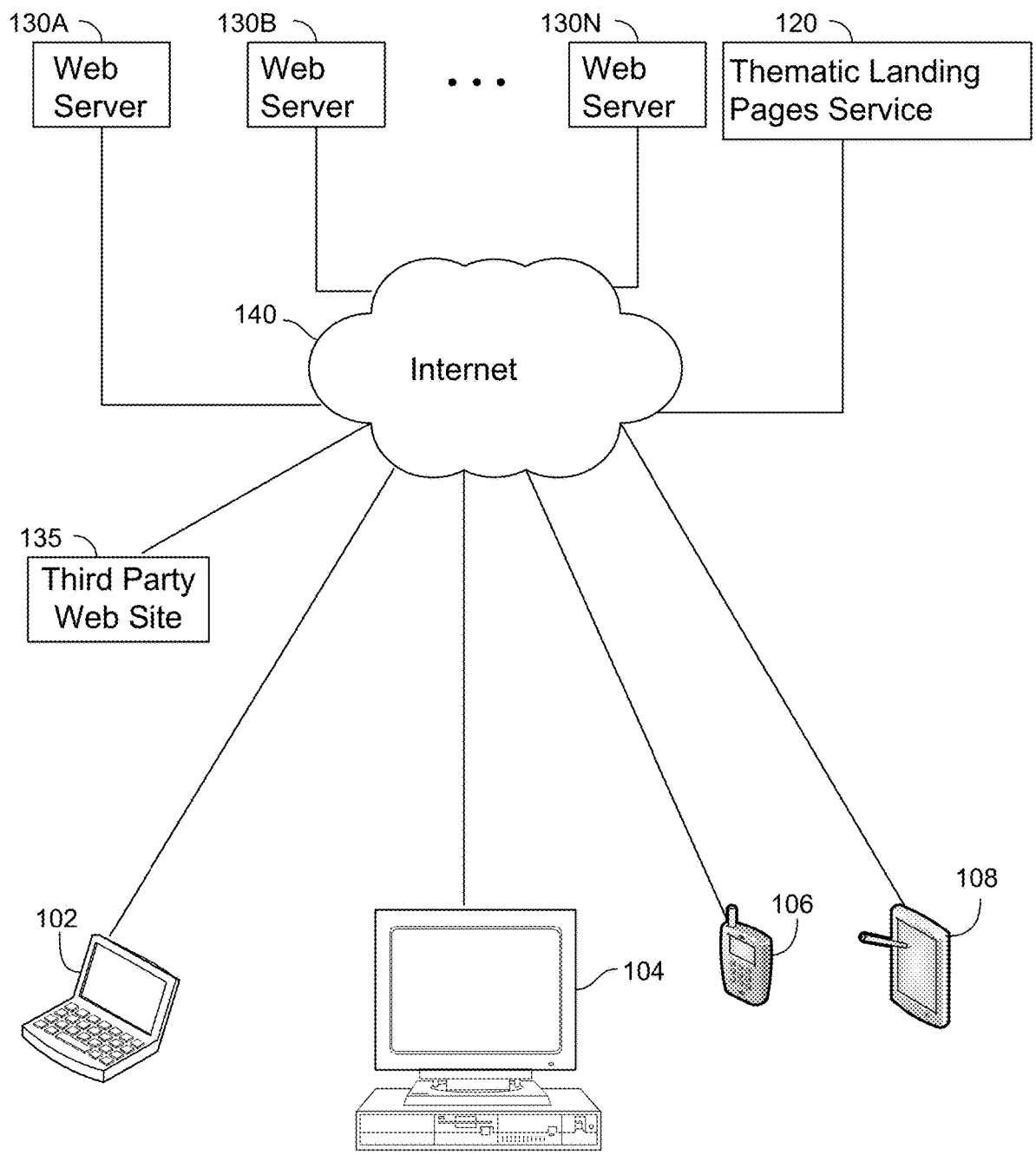
FIG. 1 is a block diagram illustrating a thematic landing pages service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the tem' 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internet-based web services can be delivered through web sites on the World Wide Web (WWW). Web pages are often formatted using HyperText Markup Language (HTML), eXtensible HTML (XHTML), or using another markup and/or programming language that can be processed by a web browser that is typically executed on a user's client device, such as a computer, tablet, phablet, smart phone, smart watch, smart television, or other (client) device (e.g., a user computing device). A web site can be hosted on a server (e.g., a web server/appliance and/or an application server/appliance) that is typically accessible via a network, such as the Internet, through a web address, which is generally known as a Uniform Resource Indicator (URI) or a Uniform Resource Locator (URL).

Web sites can generally be classified as static web sites or interactive web sites. Static web sites and interactive web sites are generally described below.

Static web sites generally include static web content. For example, a web site can include one or more static web pages stored on a web server. Such static web pages are basically delivered to a client web browser in the same format that such web pages are stored on the web server (e.g., the same content is presented to each user that navigates to that particular static web page, which provides a consistent presentation of the static content on that web page to each of the different users/visitors of that web page). Static web pages are typically coded in a markup language, such as HTML, and style sheets, such as Cascading Style Sheets (CSS), are also often used to control the appearance or style of such basic HTML web pages. Static content on a static web site is typically manually updated. For example, a web page editor or other tools can be used by a web site owner to edit the static content on a web page (e.g., editing, adding, or deleting text, photos, and/or other content on the web page).

Interactive web sites (e.g., also referred to as dynamic web sites) generally include dynamic web content (e.g., typically dynamic content can be included along with or in addition to various static content on a web site). Specifically, an interactive or dynamic web site generally includes one or more dynamic web pages (e.g., web pages with dynamic content, such as by providing one or more dynamic elements on a web page). In some cases, a dynamic web page can refer to a web page that can change or customize automatically (e.g., to change over time and/or to present different content to different users to personalize web content for different users, etc.). For example, a dynamic web page can be provided using client-side dynamic web pages that are coded, for example, using JavaScript (e.g., or another programming/scripting language, such as Java, Python, and/or other general programming languages) to implement a dynamic web page (e.g., a dynamic HTML web page) that provides instructions to a user's web browser on how to interactively modify content of the web page (e.g., to personalize the content of the web page for a given user or provide other dynamic content for the web page). As another example, dynamic web pages can also be provided using server-side dynamic web pages that are generated automatically (e.g., on the fly) by computer code executed on a server (e.g., a web server or application server) to provide, for example, the HTML and CSS for the dynamically generated content for the web page. Dynamic web pages can generally be implemented using various software platforms/tools (e.g., Java Server Pages, Active Server Pages, HTML forms, and/or other software platforms/tools) and/or using various web application frameworks and web template systems that use general programming languages (e.g., Java, Python, and/or other general programming languages) to facilitate the implementation of dynamic web content for interactive or dynamic web sites.

An e-commerce web site generally refers to a web site that allows users to purchase products or services through the web site. E-commerce web sites often include both static and dynamic content on their web sites.

A merchant as used herein generally refers to a third party entity that uses a web site (e.g., on the World Wide Web (WWW)) to engage with customers and/or to buy and sell products and/or services. A merchant web site as used herein generally refers to a web site, such as an e-commerce web site, provided by/for the merchant that facilitates the merchant's online WWW presence to engage with customers and/or to buy and sell products and/or services (e.g., for performing e-commerce on the WWW, such as an e-commerce site that offers products/services for sale, an online news web site that presents news content as an online/web service, and/or a social networking site that provides social networking as an online/web service). Merchant web sites often include both static and dynamic content on their web sites.

Web sites, such as merchant web sites or e-commerce web sites, can include a variety of different static and/or dynamic web page content. The quality of such web content is important to provide an effective web site for users and, therefore, an effective online WWW presence for merchants using e-commerce/merchant web sites to interact with customers and/or potential customers. For example, a merchant web site should generally provide access to content in a manner that is effectively presented to users and facilitates user access and navigation on the merchant web site.

Web sites (e.g., web applications and/or various other web services delivered through web sites) generally store and display content (e.g., products or services related content in the case of a retailer, such as an e-commerce site; various informational related content in the case of a publisher, such as an online news or online magazine site; and/or various other content for other types of merchant sites). For example, this content can be accessed by a user in two primary ways: (1) an internal site search approach; and (2) a non-search approach (e.g., browse and/or site navigation).

A user can also be directed to content on a web site based on organic search results and/or paid search results based on a user query entered on an Internet search engine. For example, the content on the web site, such as a merchant web site, is typically presented in an existing web page of the merchant web site, such as a home page of the merchant web site, a category page of the merchant web site (e.g., for a particular category of products/services available for sale on the merchant web site), or another existing web page of the merchant web site.

However, existing web pages of the merchant web site often do not have content that is relevant or customized to a particular theme, which may be desired for a landing page for a given marketing channel, such as further described below. For example, if a merchant is promoting a sale on a certain product (e.g., black leather dress shoes for women or black leather dress shoes for men), then the merchant will typically want to provide web pages that have products that are relevant to that theme (e.g., black leather dress shoes for women or black leather dress shoes for men). As such, providing content on the merchant web site that is relevant to that theme can promote better conversion results for that particular promotion. In some cases, the merchant's promotion may be directed through various channels (e.g., a paid marketing channel, a social channel, an organic search channel, a direct marketing channel, an email channel, etc.) and/or campaigns (e.g., an online marketing campaign). In particular, to modify existing content on the merchant web site is typically a process that is technically and/or administratively difficult, time-consuming, and slow to implement and obtain approval to launch on the web site to make any modifications to the existing content of the merchant web site and/or to add new content (e.g., new web pages) to the merchant web site. In addition, the admin(s)/personnel responsible for such web site content changes (e.g., information technology (IT)/web site admin personnel) are also typically different than the personnel familiar with and/or responsible for the online ad campaign(s) for the web site (e.g., online marketer personnel and/or SEO personnel, such as an SEO manager who is responsible for enhancing SEO of the merchant web site).

Moreover, there are several issues that exist for e-commerce web sites to create curated landing pages (e.g., thematic landing pages) that can be used in any marketing channel as discussed below, including (1) product tagging; (2) search engine optimization (SEO); (3) intuitive user interface; (4) IT independence; (5) demand identification/content gap identification; (6) page management; and (7) understanding and maintaining web page/site quality.

Product tagging: before being able to create a single page, users (e.g., often times merchants at e-commerce companies) typically have to manually tag each product in their catalog with attributes that describe what a product is (e.g., color, brand, style, etc.). This is an ongoing problem as new products are added to their catalog on a regular basis. This also requires each user to tag products in a uniform way or else it can hurt the results that are displayed on a given page. If a user wants to remove a product, they typically have to remove/change the wrong attribute of the product, which can be a tedious and manual task.

Search Engine Optimization: pages that are created are typically not optimized for organic search. This includes serving up the right products that match the topic of the page, linking to these pages across their own web site, using appropriate anchor text, preventing/removing duplicative pages across the site, not indexing pages that do not have enough content, and having a keyword-rich Title, Tags, and Headers.

Intuitive user interface: most current systems are extremely outdated and difficult to use. There typically is no visualization that shows users the page they are creating, so they have to "guess" what the page is going to look like when launching. Additionally, modifying elements on the page, such as the order of products or adding new products is typically not an easy or quick task. Finally, the ability to add text on a page that is added using server-side web technology to help from an SEO standpoint is generally not an easy task on existing content management systems.

IT-Independence: many e-commerce companies cannot launch a single new page without the help of their IT staff (e.g., an IT/web site admin). Thus, launching a new page can often require anywhere from one day to several weeks.

Demand identification/content gap identification: most users neither know the demand that exists on the Internet nor do they know what pages to create to satisfy that demand. They have no knowledge of content gaps they currently have in their site.

Page management: users without a content management system typically cannot easily modify elements of a single page nor can they launch or remove pages quickly.

Understanding and maintaining quality: users typically have no way to monitor or measure the quality of the content on individual pages as well as across pages over time on their web site. Specifically, users generally cannot measure how unique one page is versus other pages on the site, how relevant the content on the page is versus the topic of the page, and the fluctuation of content on a given page.

What are needed are new and improved techniques to facilitate thematic content for presentation on web sites that can be efficiently and effectively configured to provide thematic landing pages. Accordingly, techniques for thematic landing pages are disclosed. For example, an SEO manager for a merchant web site can use the disclosed thematic landing pages system to automatically generate and customize content on a web page for a particular theme (e.g., to facilitate a more effective web services for the web site for a given marketing channel(s) and/or to respond to user demand, etc.), which can address one or more of the above-described issues and shortcomings of existing approaches to web services by using the disclosed thematic landing pages techniques, such as further described herein.

Thematic Landing Pages—Overview

Techniques for thematic landing pages are disclosed. In some embodiments, a system for thematic landing pages includes a user interface for receiving a user query for a theme; a product matcher engine (e.g., executed on a processor) for determining products that are relevant to the theme (e.g., based on a content relevancy); and a page composer engine for generating a thematic web page for the theme based on the relevant products. As an example, the thematic landing page can correspond to a web page that is returned in response to a search query. As another example, the thematic landing page can correspond to a web page that is presented using a widget on a merchant web site (e.g., a related searches widget or a related products widget).

In some embodiments, a process for providing thematic landing pages includes receiving a user query for a theme; determining products (e.g., using a processor) that are relevant to the theme (e.g., based on a content relevancy); and generating a thematic web page for the theme based on the relevant products. For example, the thematic landing page can be associated with a merchant web site, and the relevant products can be products that are available via the merchant web site.

In one embodiment, thematic landing pages can be used to enhance web sites, such as merchant/e-commerce web sites, such as further described herein. As also described herein, thematic landing pages can also be applied to any online/web-based interaction and entry to a web site. As used herein, a landing page generally refers to an initial web page that a user arrived or "landed" on, when navigating or being directed to a web site. For example, traffic to a web site can originate from ads/online marketing campaigns, and can also originate from other sources, such as an organic search on an online search engine (e.g., Google®, Yahoo®, Microsoft Bing®, etc.), a direct input of a merchant URL to the browser, social media, and/or other sources.

In some embodiments, a system and process for providing thematic landing pages (e.g., implemented, for example, as a landing page manager) are disclosed. In some implementations, a thematic landing pages system/service provides e-commerce websites and companies an online web services solution to efficiently and automatically create curated landing pages (e.g., thematic landing pages, which generally refer to landing pages automatically generated based on themes, such as further descried herein) from scratch. For example, the generated thematic landing pages can be used in any online marketing channel, such as organic, paid, e-mail, direct, and social channels, and such can be generated, customized, and launched without IT support (e.g., without requiring the web site/IT admin assist in creating the web page and launching the web page on the web site). For example, whether a user needs to create web pages (pages) tied to a marketing calendar, key terms they wish to target, or latest trends, the disclosed thematic landing pages system/service can generate suggested pages for the user to launch as well as allow the user to request page theme ideas. After selecting the pages that the user desires to create, the user-friendly interface can also allow the user to curate such pages (e.g., edit/customize the pages) by searching for and adding products by dragging, dropping, and reordering them on the page all without having to manually tag each product with attributes. Through an intuitive user interface (e.g., WYSIWYG user interface (UI)), users can also modify the Page, Title, and Header, remove individual products, and lock products in specific locations to tailor the experience to fit the web site's visitors, which can be important to create a seamless experience between the email creative and the landing page. As another example, users can also add content on the page, such as text, images, and promotional banners through an editor that allows users to add HTML in specific locations on the generated thematic landing page. In addition, any thematic landing page launched through the landing page manager can also be optimized for organic search using, for example, related searches and thematic page technologies (e.g., available from BloomReach, Inc.) to ensure the pages are found by search engines, that they are refreshed when products go in-stock/out-of-stock, and/or prevent duplicative pages from being indexed.

In an example implementation, thematic landing pages can be delivered by a third-party outsource/service provider as a thematic landing pages service, such as described herein.

As further described below, these and various other features and techniques are disclosed for providing thematic landing pages to enhance online web services, such as for e-commerce web sites (e.g., merchant sites).

Overview of an Example Thematic Landing Pages. Service

FIG. 1 is a block diagram illustrating a thematic landing pages service in accordance with some embodiments. In an example implementation, thematic landing pages can be delivered by a third-party outsource/service provider as a thematic landing pages service 120, such as described herein.

As shown, various user/client computing devices, such as a laptop computer 102, a desktop computer 104, a smart phone 106, and a tablet 108 (e.g., and/or various other types of computing devices that can access the Internet to, browse, for example, various types of web sites) are in communication with Internet 140 to access various web sites provided by different web servers 130A, 130B, . . . , 130N (e.g., which can each serve one or more web sites, such as one or more different merchant web sites).

For example, the web servers can each provide a web site, such as a merchant's web site that can offer various products and/or services for sale from the merchant and/or various other types of web sites. Each of the web sites can also include various content that can be used for populating content on thematic landing pages. Thematic landing pages can be generated and customized using the thematic landing pages service as further described herein.

For example, thematic landing pages can be generated and customized for enhancing content on the merchant web site by providing web pages that include content relevant to various different themes, such as for providing content on a web page for specific channels, for providing content on a web page for specific promotions, for providing content on a web page for specific themes, and/or various other purposes that can benefit by providing content on web pages of the web site that are relevant to a given theme(s), such as further discussed below.

In an example implementation, the merchants of each of the web servers can subscribe to thematic landing pages service 120 (e.g., which can be provided as a cloud-based thematic landing pages service for web sites). In some implementations, the thematic landing pages service provides various techniques for generating and configuring thematic landing pages that can be used to enhance the content, searchability (e.g., such thematic landing pages can be crawled and improve search results and rankings of the merchant web site for various user queries that are relevant to certain themes for which thematic landing pages have been generated for the merchant web site), and performance of the merchant's web site (e.g., conversion rates can be improved by providing thematic landing pages that are responsive to a user's query for desired content, such as products/services or other content), such as disclosed herein.

In one embodiment, the thematic landing page corresponds to a web page that is returned to a web browser executed on a user/client computing device. As an example, for a given merchant web site, such as www.ACME.com, a new thematic landing page can be generated with a URI such as th.ACME.com/EXAMPLE-THEMATIC-LANDING-PAGE-1. In this example, the new thematic landing page can be crawled and, thus, indexed by Internet search engines. As such, the new thematic landing page can be returned in response to a user query on a search engine, such as a search engine provided by a third party web site 135, as an organic search result such that the user can click on the above-referenced new URI for the new thematic landing page, and the thematic landing pages service can return the requested new thematic landing page. In this example implementation, the new thematic landing pages for the merchant can be hosted by the thematic landing pages service. The URI for the new thematic landing page can also be provided via a paid search result in response to the user query on the search engine (e.g., based on paid keywords that are relevant to and/or match the theme associated with the new thematic landing page). In some cases, the request for the URI corresponding to the new thematic landing page can be received through various other requests (e.g., via an advertising (ad) link, such as a key word-based ad link or other online ad; a specific channel, such as a social channel, email channel, organic search channel; etc.) that are selected (e.g., clicked) by a user when browsing on a third party web site 135 (e.g., a search engine web site or other web site that can display such a link/URI for the new thematic landing page). In some cases, the thematic landing page can include customized content for an online advertisement campaign that is associated with the URI (e.g., an advertising link that includes the destination URI for the new thematic landing page). In particular, by providing thematic landing pages that are generated and customized for a given theme for a merchant web site, the merchant web site performance for searchability (e.g., SEO optimization) and user experience can be enhanced as further described herein.

In some implementations, the thematic landing pages service can be implemented on a computer server or appliance (e.g., or using a set of computer servers and/or appliances) or as a cloud service, such as using Amazon Web Services® (AWS) or other cloud service providers. For example, thematic landing pages service 120 can be implemented on one or more computer servers or appliance devices or can be implemented as a cloud service, such as using Amazon Web Services® or another cloud service provider for cloud-based computing and storage services.

Overview of an Example Thematic Landing Pages System

Figure 2:
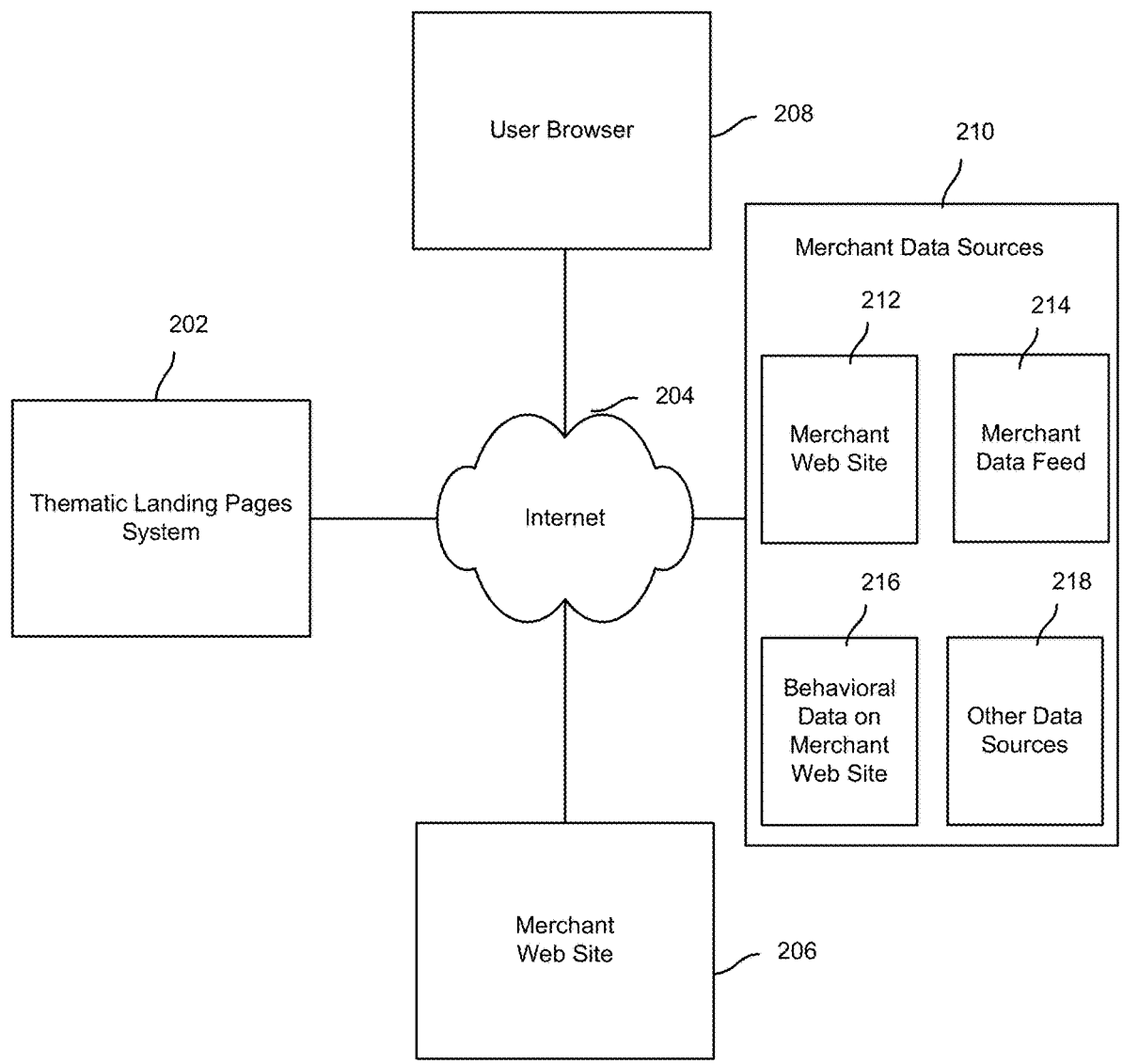
FIG. 2 is a functional block diagram illustrating an architecture of a system environment for providing thematic landing pages in accordance with some embodiments.

FIG. 2 is a functional block diagram illustrating an architecture of a system environment for providing thematic landing pages in accordance with some embodiments. FIG. 2 provides an exemplary architecture of a thematic landing pages system 202 for providing thematic landing pages to facilitate enhanced online web services that can be implemented using various computing hardware and performing various processes executed on computing hardware as will be further described below. For example, thematic landing pages system 202 can be implemented on the thematic landing pages service 120 as shown in FIG. 1.

Referring to FIG. 2, thematic landing pages system 202 is shown in communication with Internet 204. Thematic landing pages system 202 is in communication with one or more merchant web sites, such as a merchant web site 206 as shown. Thematic landing pages system 202 is also in communication with one or more user browsers, such as a user browser 208 as shown (e.g., a web browser, such as Apple Safari®, Google Chrome®, Microsoft Internet Explorer®, or another web browser, which can be executed on a user client/computing device, such as a laptop/desktop computer, tablet, smart phone, smart watch, or another client device capable of Internet/WWW access). Also, merchant web site 206 is in communication with user browser 208 via Internet 204 as also shown. Thematic landing pages system 202 is also in communication with various data sources (e.g., merchant web services related data sources) via Internet 204, such as further described below.

As also shown in FIG. 2, data sources include various merchant data sources, shown as merchant data sources 210. As shown, merchant data sources 210 can include a merchant web site 212 (e.g., a corpus of content, such as one or more web pages that are published on the merchant's web site 206), a merchant content data feed 214 (e.g., a merchant product data feed and/or other merchant content data feed, such as further described below with respect to various embodiments), behavioral data on the merchant web site 216 (e.g., user behavior on merchant web site 206 can be captured using pixel log data techniques, such as further described below), and various other data sources 218 (e.g., various other web data sources including search logs, social media data sources, electronic mail data sources, browsing history data sources, and/or other data sources can be provided).

As will now be apparent to one of ordinary skill in the art, similar web services related data for a plurality of different web sites (e.g., different merchant web sites and/or other types of web sites that can utilize thematic landing pages for e-commerce and/or other online services) can be provided to facilitate using thematic landing pages system 202. For example, a cloud service can be provided for enhancing SEO and user accessibility for merchant and/or other web sites by applying thematic landing pages techniques for web services (e.g., a subscription service for thematic landing pages for merchant web sites, which can be implemented as a cloud service), such as further described herein.

In an example implementation, thematic landing pages system 202 is in communication with each of the merchant data sources, such as shown in FIG. 2, to receive merchant web site data, merchant data feeds, behavior data on the merchant web sites, and/or other data sources for each of the one or more merchants. For example, merchants can subscribe to a cloud service for thematic landing pages to improve web service related to online ad campaigns, online traffic sources/channels, and/or users for their respective web sites. As another example, a merchant can implement the thematic landing pages system as an integrated solution with their web site (e.g., implemented locally in the merchant's own data center or with a cloud service provider that hosts their web site(s), such as using Amazon Web Services® (AWS) or other cloud service data center providers).

In some embodiments, the above-described data sources (e.g., data sources 210 such as for a given merchant and/or other data sources for other merchants) can be processed using various techniques as described below. For example, a web site content fetching process can be performed (e.g., implemented using a web site content fetching engine) to fetch web pages from a merchant web site (e.g., to periodically (crawl and) fetch web pages from merchant web site 206, and also shown as a data source, merchant web site 212 of merchant data sources 210). The content (e.g., HTML content, dynamic content such as Java Script content, and/or other content) from the fetched web pages from the merchant web site can then be parsed to extract attributes for a product, such as a title, a heading, a description, a price, a color(s), and/or a size(s). As another example, a merchant data feed retrieving process can be performed (e.g., implemented using a merchant data feed retrieving engine) to retrieve merchant content/product data feeds (e.g., merchant data feed 214) and parse product attributes, such as title, heading, description, and/or price. In some cases, a merchant data feed can include a content classification (e.g., a merchant product data feed can include a product classification). As yet another example, a behavior data collection process can be performed (e.g., implemented using a behavioral data collection engine) using pixel data on a merchant's web site. Using this approach, when a user visits a web page of a given merchant's web site, then dynamic content (e.g., Java Script code or other dynamic code/content) on the web page generates a pixel request to the merchant data sources (e.g., a server that is provided for capturing behavioral data on the merchant web site, such as shown as merchant data sources 210) that includes, for example, a machine IP (e.g., the IP address associated with the user's device), a user ID (optional), a referrer URL (e.g., the URL of the web page that preceded the web page in question), a web page URL, and/or other information (optional). In this example, raw pixel data can then be provided from each of the merchants (e.g., shown as behavioral data 216 for merchant web site 206). Each of the data sources is described in more detail below in accordance with various embodiments.

As similarly described above, a continuous/periodic process can be performed (e.g., daily, weekly, or some other periodic interval) to fetch pages from a merchant web site (e.g., implemented using a web site content parsing engine, which can be implemented to perform fetching and parsing operations as described herein). For example, the fetching operation can receive as input a list of URLs on a merchant web site and can then fetch the content of the web page (e.g., HTML and/or other content on each of the fetched web pages). The HTML content of a fetched web page can then be parsed using parsing rules configured for merchant web pages (e.g., manually configured for a particular merchant's web pages or using a default configuration for parsing typical merchant web pages). The parser operation can parse each page to extract attributes, such as title, heading, description, and price. As such, content published on a merchant's web site can be fetched and parsed, and the merchant's web site content can then be used for performing various thematic landing pages techniques disclosed herein.

As similarly described above, a process can be performed to retrieve merchant data feeds for each of the merchants (e.g., implemented using a merchant data feed retrieving engine as described herein). In an example implementation, the merchant can either provide a location to fetch the merchant data feed or upload the merchant data feed to a location specified for retrieving (e.g., pulling) the merchant data feed (e.g., periodically or upon demand) For example, the merchant data feed can be provided as a file (e.g., in a structured data format that can be parsed, such as in an XML or other file format that provides a (subset) view of, for example, a merchant's product/service catalog, such as by providing incremental updates to product catalog information using such merchant data feeds). In some cases, the merchant data feed can be provided on a daily or hourly basis (e.g., or at some other periodic/time interval and/or based on demand). The merchant data feed can be parsed using parsing rules configured for a given merchant or a set of merchants (e.g., based on types/groups of merchants) to extract attributes, such as title, heading, description, price, and/or various other attributes. For example, the merchant data feed includes a content classification (e.g., a merchant product data feed can include a product classification) that can then be used for performing various thematic landing pages techniques disclosed herein.

Another data source of information is behavioral user data on a web site, such as merchant web site 206. In some cases, a user may visit a merchant web page, such as a user using user browser 208 via Internet 204. For example, Java Script code (e.g., or other executable code/content) on the web page can make a pixel request to a server/service (e.g., to a server/service of the merchant data sources and/or a server/service of the service provider for the thematic landing pages system) that includes, for example, a machine IP (e.g., the IP address associated with the user's device), a user ID (optional), a referrer URL (e.g., HTTP referrer), a web page URL, and/or other information (optional). The list of web page URLs can be combined periodically (e.g., each day or at some other periodic interval) and provided as input to the above-described fetching and parsing process to extract information from web pages of a merchant's web site. In an example implementation, for each user, information can be stored to identify products visited and purchased by the user. Similarly, information can be stored to aggregate all user visits and products purchased on a merchant web site. As such, various web site activity related metrics, such as number of impressions, number of views, add to cart actions, number of purchases, and/or other metrics, can be collected to provide behavioral data on a merchant's web site, and the behavioral data on the merchant's web site can then be stored and used for performing various thematic landing pages techniques disclosed herein (e.g., to suggest themes based on user browsing/searching activities on the merchant web site, to monitor performance of the merchant web site, such as conversion rates for various web pages/landing pages, etc.).

In one embodiment, the above-described processes for merchant data sources' collection and processing are performed per each merchant. For example, each merchant's data is processed independently using the above-described processes for processing each merchant's respective data sources to implement various thematic landing pages techniques disclosed herein for each of the merchant's respective web sites.

For example, a third-party outsource/service provider (e.g., a web solutions service provider) can implement a thematic landing pages service for merchants that can be used by merchants to create thematic landing pages for the merchants' respective e-commerce web sites (e.g., Bloom-Reach Inc. offers such a thematic landing pages service, commercially available as BloomReach Pages, which allows subscribers of the service to create thematic landing pages for any marketing channel), such as described herein. Thematic landing pages enable web site administrators (admin) (e.g., in some cases, this can include digital marketers or SEO managers) for web site providers (e.g., a merchant with an e-commerce web site for selling products/services, and/or other types of web sites) to create web pages (e.g., landing pages) with configurable/customized content relevant to different themes, such as to create landing pages for any marketing channel (e.g., paid search, display, social, and/or other marketing channels; and, in some cases, such a landing page can be created for an online ad campaign) using existing content available on the web site (e.g., products/other information that can be found on the existing web site, but may not be available on a single web page of the web site, such as to aggregate a set of products that are relevant to the selected theme on a new thematic landing page, and, in some cases, to also include only in-stock products based on in/out-of-stock information for the merchant web site). In an example implementation, behavioral data (e.g., products/categories viewed, add-to-cart, etc.) can also be used by the thematic landing pages service, such as to suggest relevant themes based on relevant behavioral data (e.g., if a digital marketer requests suggested themes for women's boots, then the thematic landing pages service can suggest relevant themes including, for example, a theme for women's winter boots if recent user activity on the merchant web site revealed user browsing and/or purchase activities related to women's winter boots).

In an example implementation, the user can configure a criteria by which to rank/re-rank the selected products relevant to the selected theme, such as revenue generated, conversion rate, user preferences and user behavioral data, total views, or other criteria. Using the disclosed thematic landing pages techniques, a web site admin (e.g., in some cases, an online marketer, SEO manager, or other user) is also able to configure the generated thematic landing page to customize content on the new thematic landing page, such as further described below. Moreover, the web site experience remains consistent, such that a merchant web page "look and feel" remains consistent, and any other maintenance of the web site is not affected, such as further described below.

In an example implementation, a thematic landing pages solution (e.g., implemented as a product and/or service) is disclosed that can be used to provide the following product/service related goals. For example, thematic landing pages can allow web site providers to easily manage and deliver thematic landing pages (e.g., new thematic landing pages can be created and launched in a short period of time, such as in as little as five minutes). In some cases, content of the thematic landing pages can be based on one or more of the following: relevant content on one or more web pages of the merchant web site (e.g., products, categories, text, images, etc.), data available in the merchant product catalog (e.g., products, categories, text, images, etc.), an online ad/marketing campaign, behavioral data (e.g., products/categories viewed, add-to-cart, etc.), content performance metrics (e.g., relevance, revenue per visit, conversion rate, views, etc.), out-of-stock/in-stock information, product/service price, and tracking of key metrics to provide performance analytics for thematic landing pages.

In an example implementation, a thematic landing pages solution (e.g., implemented as a product and/or service) is disclosed that can be used to provide one or more of the following product/service aspects. A thematic landing pages solution can be applied to any type of landing page. A thematic landing pages solution can be implemented as a high availability, high throughput, and low latency web page serving service. A thematic landing pages solution can generate and report various performance data tracking and analytics processed and available periodically (e.g., hourly, daily, weekly, etc.). A thematic landing pages solution can allow a customer (e.g., web site provider) to enable thematic landing pages with minimal integration cost and effort while maintaining the overall "look and feel" of the thematic landing page to be similar/consistent with other, existing web pages of the merchant web site. A thematic landing pages solution can be implemented as a modular design that allows web page editing capabilities to be used across a platform for enhanced web services (e.g., using a service provider's platform, such as the BloomReach Personalized Discovery Platform with, for example, applications for organic search, site search and content marketing and merchandising, and integration to access all the power of the Web Relevance Engine). A thematic landing pages solution can provide a WYSIWYG interface that provides easy access and management of thematic landing pages and content blocks (e.g., dynamic content blocks and/or other customized content blocks), such as further described below.

Figure 3:
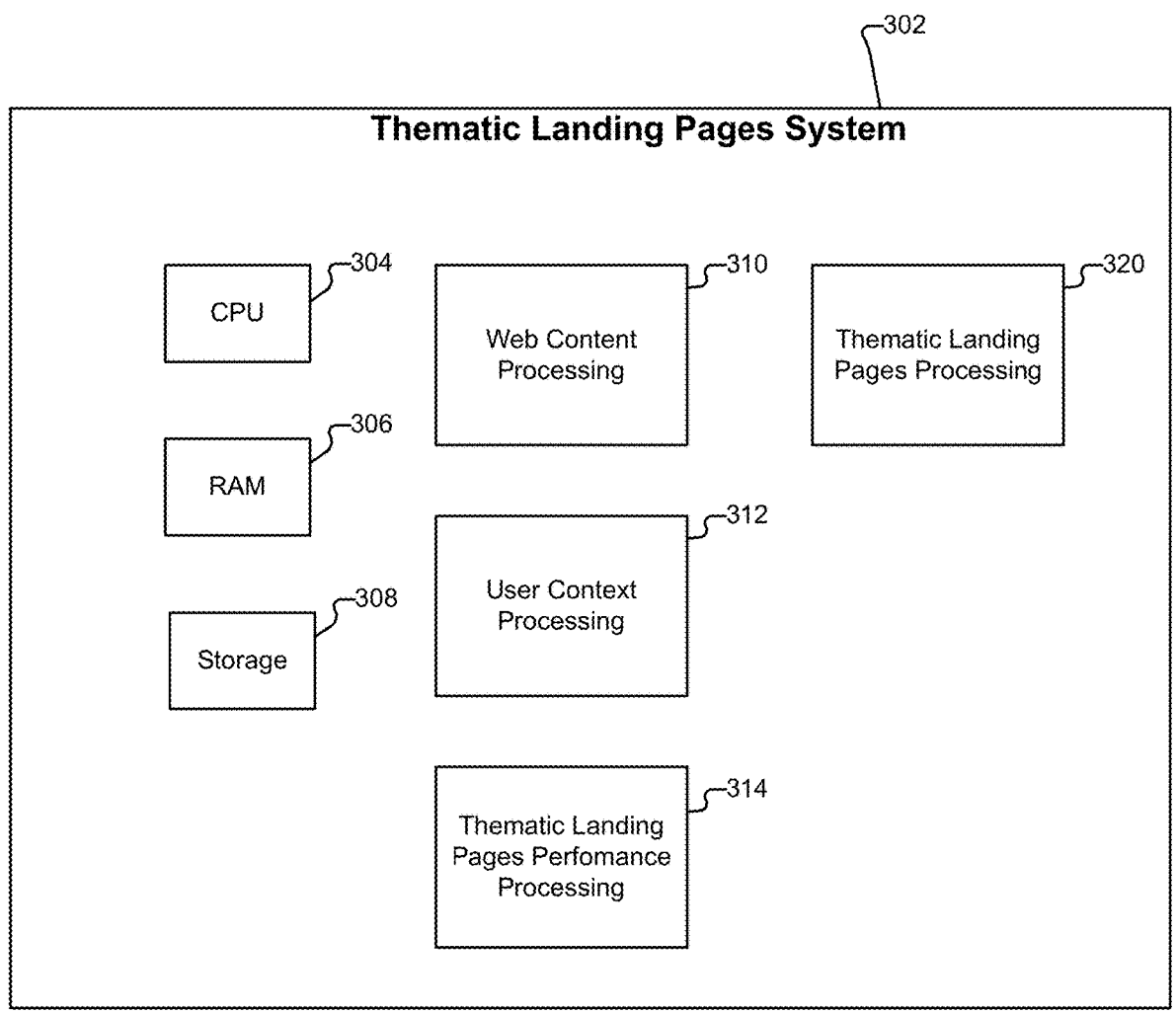
FIG. 3 is a functional block diagram illustrating a thematic landing pages system in accordance with some embodiments.

FIG. 3 is a functional block diagram illustrating a thematic landing pages system in accordance with some embodiments. As shown, a thematic landing pages system 302 includes a CPU 304, a RAM 306, and a data storage 308. For example, thematic landing pages system 302 can be implemented to provide the thematic landing pages service 120 as shown in FIG. 1 and the thematic landing pages system 202 as shown in FIG. 2.

As also shown in FIG. 3, thematic landing pages system 302 includes a web content processing component 310 (e.g., to process web content of a web site to implement various thematic landing pages techniques described herein), a user context processing component 312 (e.g., behavior signal data that provides monitored/tracked user activities data can be provided for subscriber/monitored web sites by using click logs/pixel tags data for monitoring user activities during a session to provide a user's browsing history, and/or other behavior signal data as described herein), thematic landing pages performance processing component 314 (e.g., for processing performance signals associated with one or more thematic landing pages for subscriber/monitored web sites, which can be used to generate performance reports for thematic landing pages associated with a given online marketing/ad campaign and/or to perform a feedback loop on the efficacy of the thematic landing pages, as further described herein), and a thematic landing pages processing component 320 (e.g., for generating and customizing thematic landing pages using various techniques described herein). The processing performed by each of these components is further described below. In some implementations, one or more of these functions can be performed by another device or function, such that the user context/behavior signal processing and/or the other signal processing can be performed using another device or function, which can provide respective input to the thematic landing pages system. As another example implementation, various components can be implemented as a common component, such as a user context/behavior processing component that can be implemented to receive and process both behavior signals and other signals (e.g., thematic landing pages performance signals). In an example implementation, the thematic landing pages system is implemented using the Apache Solr open source framework, the Apache Cassandra™ database, and various other components as further described below with respect to FIG. 4.

In an example implementation, thematic landing pages system 302 can be implemented to provide the thematic landing pages service 120 described above with respect to FIG. 1 and the thematic landing pages system 202 of FIG. 2. For example, a thematic landing page for a subscribing merchant web site (e.g., a web site that subscribes to thematic landing pages service 120) can be processed using CPU 304 and RAM 306 to automatically generate a thematic landing page that can be launched and stored (e.g., cached) in storage 308 and communicated to a user that clicked a link (e.g., URI) associated with the launched thematic landing page for presenting the thematic landing page to the user via the user's web browser executed on the user's device (e.g., a client/computing device, such as via a web browser executed on a smart phone, laptop, computer, or other client/computing device).

An example component diagram showing various components of thematic landing pages system 202 of FIG. 2 and thematic landing pages system 302 of FIG. 3 will now be described with respect to FIG. 4. Various thematic landing pages techniques are also further described below with respect to FIG. 4.

Components of the Thematic Landing Pages System

Figure 4:
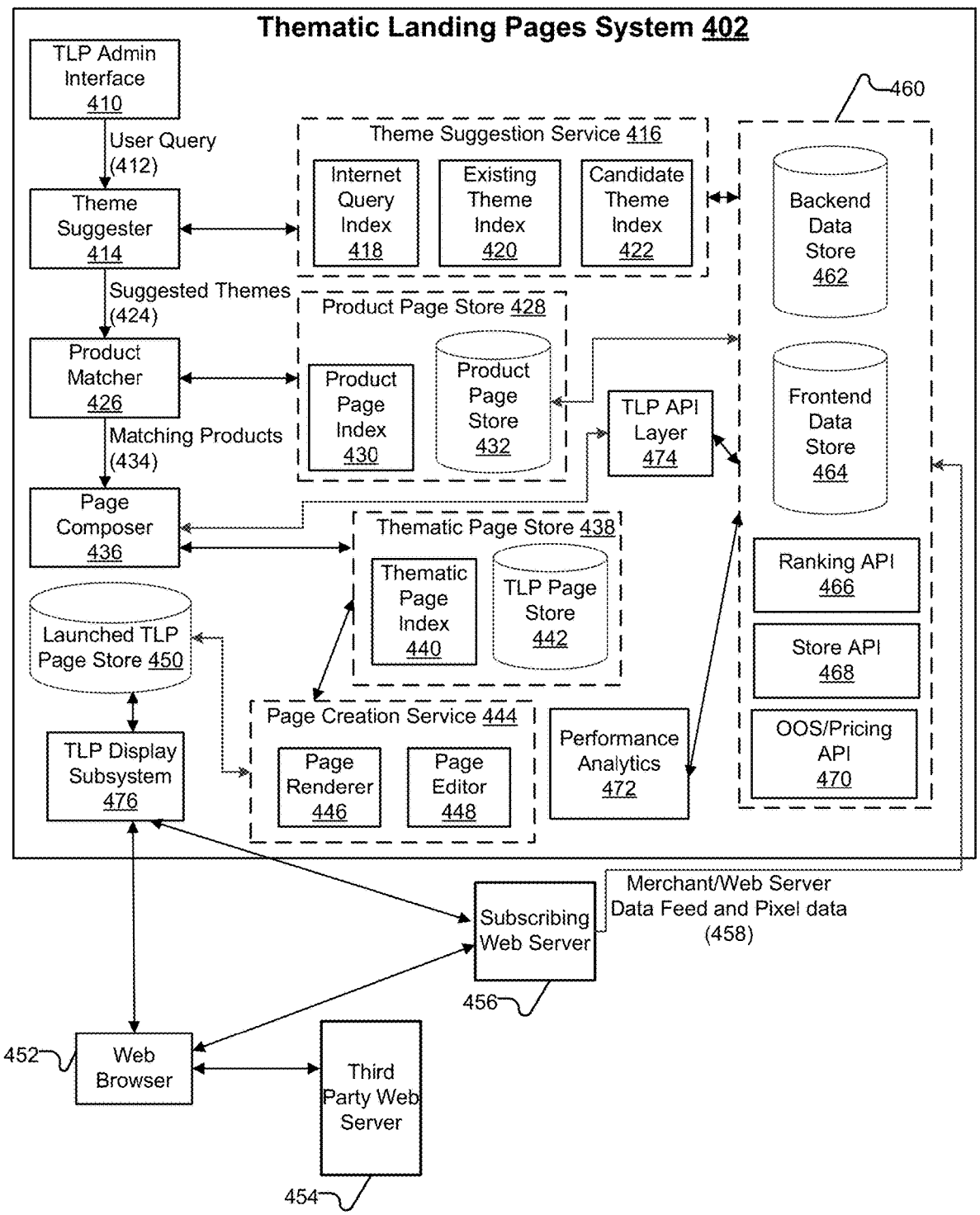
FIG. 4 is a functional block diagram illustrating a component diagram of the thematic landing pages system in accordance with some embodiments.

FIG. 4 is a functional block diagram illustrating a component diagram of the thematic landing pages system in accordance with some embodiments. In particular, FIG. 4 illustrates an architecture of a system for providing thematic landing pages for a web site (e.g., a merchant web site or other web site) in accordance with some embodiments.

In one embodiment, a thematic landing pages system 402 (e.g., landing page manager) can be used to create web pages based on themes (e.g., using the disclosed thematic technology) to suggest and generate new web pages automatically based on user selected themes, the user can then curate such pages (e.g., modify products/other content that were automatically populated using the thematic technology). For example, the thematic landing pages system can suggest new pages based on customer demand (e.g., based on monitored user activity on the merchant web site and/or across relevant merchant web sites).

In an example implementation, these thematic landing pages are server-side generated (e.g., as opposed to JavaScript/client—side technology), so that such pages are crawlable (e.g., crawlable by search engine crawlers, and, in an example implementation, a given page can be configured to allow for such crawling or not, which can be configured, for example, by using a no index tag or not).

In an example implementation, these pages are generated to ensure that such pages have sufficient content (e.g., to avoid generating pages with thin content, the thematic landing pages system can be configured to require at least a minimum number of products, such as at least four products, or to generate an alert to a user that there is not sufficient product/relevant content for such desired theme for a new web page, and/or generating an alert that an existing thematic landing page no longer has sufficient products/content—has become too thin based on a threshold value for thin content, such as further described below). The thematic landing pages system can also be configured to handle duplicate thematic landing pages for a given merchant web site (e.g., to verify whether a newly requested thematic landing page is not duplicative of any other thematic landing pages, and if so, the thematic landing pages system can also be configured to not index (e.g., no index) a lower traffic thematic page that already exists, and/or the thematic landing pages system can also be configured to not generate a new thematic landing page that would be duplicative of another thematic landing page, and/or alerting that there is no longer sufficient products/content, and/or generating an alert that an existing thematic landing page has become duplicative of another thematic landing page based on a page uniqueness score, such as further described below). For example, a quality of generated thematic landing pages can be automatically checked periodically (e.g., daily, weekly, etc.) to verify a quality of the page meets a threshold (e.g., content score—not thin content, not duplicate; uniqueness score—such that if duplicated, can select higher traffic/number of visits per page and remove the other page; if page is determined to have thin content, then the thematic landing pages system can configure the page for no indexing such as by adding a no index tag to a low quality page, etc.). In addition, such pages can be used for a variety of channels, including, for example, organic search, paid search, electronic communications (e.g., direct electronic mail (e-mail)), and/or other channels.

In some implementations, the thematic landing pages system can allow e-commerce websites and companies to efficiently and automatically create curated landing pages (e.g., based on thematic pages) from scratch to be used in any online marketing channel, such as organic, paid, e-mail, direct, and social channels—all without IT support. For example, whether a user needs to create pages tied to a marketing calendar, key terms they wish to target, or latest trends, the thematic landing pages system can generate suggested pages for users to launch as well as allow a user to request page theme ideas. After selecting the pages that they wish to create, an intuitive, user-friendly interface (e.g., WYSIWYG UI) allows users to curate these pages by searching for and adding products by dragging, dropping, and reordering them on the page all without having to manually tag each product with attributes, such as further discussed below with respect to FIG. 4.

Referring to FIG. 4, a thematic landing pages (TLP) system 402 includes a TLP admin interface 410 that provides a user interface (UI) for using the TLP system to generate, customize, and launch thematic landing pages. As shown, a user (e.g., a digital marketer and/or an SEO manager for ACME.com) can use the TLP admin interface to submit a user query 412 (such as typing a query for "black leather shoes") of a dashboard of the TLP system (e.g., a page generation screen of the dashboard). The user query is received at a theme suggester 414 (e.g., a theme suggester engine).

The theme suggester communicates with a theme suggestion service 416 to generate suggested themes (e.g., in the above example, to suggest themes for a new web page that are relevant to the user query of "black leather shoes"). For example, the theme suggestion service can be implemented as a locally executed service as shown, or as a cloud-based/web-based service, that can automatically suggest themes based on a user query. The theme suggestion service includes an Internet query index 418, an existing theme index 420, and a candidate theme index 422. In an example implementation, a look-up of already generated themes (e.g., previously generated themes) can be performed by determining whether a thematic page (e.g., thematic landing page) that matches the theme was previously created by checking the existing theme index (e.g., the existing theme index can be implemented using an Apache SOLR search index). In addition, a look-up in a query database can be performed by performing a search of the Internet query index (e.g., including query log data from one or more merchant web sites, from site searches on such merchant web sites, and the Internet query index can also be implemented using an Apache SOLR search index). Also, a look-up in the candidate theme index can be performed to return candidate themes based on the user query (e.g., including previously suggested themes but not yet launched on the merchant web site, and the candidate theme index can be implemented using an Apache SOLR search index). The theme suggester can communicate suggested themes 424 (e.g., one or more suggested themes can be generated using various techniques implemented by the theme suggester in communication with the theme suggestion service, such as further described herein) to a product matcher 426 (e.g., a product matcher engine).

The product matcher is in communication with a product page store 428. The product page store includes a product page index 430 (e.g., the product page index can be implemented using an Apache SOLR search index) and a product page store 432 (e.g., the product page store can be implemented using an Apache Cassandra database). For example, the product matcher can determine products that match the suggested theme(s) (e.g., a set of one or more products that are relevant to a given theme name, such as a set of 10, 100, or another number of products that match the "black leather shoes" theme and are offered for sale on the ACME.com merchant web site). The determined set of matching products 434 is communicated to a page composer 436 (e.g., a page composer engine).

In an example implementation, the product matcher determines products provided by a given merchant web site (e.g., ACME.com) based on the user query by using keywords in the user query to identify matches to products based on a relevance match, such as based on content relevancy (e.g., product title, product description/body, scoring products based on weights associated with different product fields, and identify matches based on a threshold match according to a highest scoring set of products matching the suggested/selected theme(s), etc.).

An example implementation of a weighted function/algorithm (e.g., implemented as an unstructured Solr query) that can be performed by the product matcher to determine products provided by a given merchant web site (e.g., ACME.com) based on the user query by using keywords in user query to identify matches to products based on a relevance match (e.g., based on a (content) relevancy score as shown below), is provided below.

Example product matching function for a user query of "red shoes":
// brip: BloomReach Identified Product (BRIP), a data concept that uniquely identifies a product based on attribute extraction (e.g. iPhone 6 is the BRIP for a Black 64 GB iPhone 6)
// xxx_shoes means a field contains the word "shoes." The value is either 1 or 0.
A=brip_shoes*brip_lastword shoes*color_red)*1000*1000
B=Max(title_red*10+heading_red*10, description_red*1)
C=Max(product_id_shoes*100, title_shoes*10, heading_shoes*10, description_shoes*1)
Score=Max (A, Min(B, C))

In this example implementation, the product page index is implemented as an Apache SOLR index, and the product page database includes product data relevant to the merchant products (e.g., including product data from a merchant product catalog received from a merchant product catalog data feed, and crawled pages of the merchant web site, such as described herein). Based on the product match results, a static page (e.g., a static URI/URL) for each of these thematic pages can be created, and a new web page can be populated with a threshold number of product match results using the page composer (e.g., ranked product match results, including product name/title and image, and/or other information, in which products can be ranked based on content relevancy and/or additional ranking criteria, such as popularity, conversions, in-stock/availability, etc.) for each of the respective selected/suggested themes (e.g., if ten suggested themes, then ten different static web pages can be composed as new static web pages populated with respective matching products). For example, the title of the newly generated thematic page can be the corresponding theme for that new web page (e.g., which can be edited by the user using the page editor, such as described below). In some cases, the page composer can select a maximum number of products (e.g., a configurable value) to be shown on the thematic page. In some cases, if a threshold number of matching products is below a minimum threshold (e.g., four products or another configurable value), then the page composer can return a response to indicate to the user that an insufficient number of products provided by the merchant (e.g., ACME.com) match the theme, and a suggested thematic page is not generated.

The page composer automatically generates the thematic pages by populating content on each of the thematic pages using the respective matching products, such as further described herein. The page composer is in communication with a thematic page store 438. The page composer communicates the automatically generated thematic pages to the thematic page store as shown. The thematic page store includes a thematic page index 440 (e.g., for indexing the thematic pages, and the thematic page index can be implemented using an Apache SOLR search index) and a TLP page store 442 (e.g., for storing the thematic pages, and the TLP page store can be implemented using an Apache Cassandra database).

A page creation service 444 (e.g., implemented using Velocity or another programming/templating language) allows the user to edit (e.g., customize) one or more of the previously generated thematic landing pages. The page creation service 444 is in communication with the thematic page store for access to the previously generated thematic landing pages as shown. The page creation service includes a page renderer 446 (e.g., a page renderer engine for rendering a previously generated thematic page as an editable HTML web page) and a page editor 448 (e.g., implemented to provide an intuitive, WYSIWYG user interface that allows the user to edit and customize the thematic page, such as to edit a title and hl/header of the HTML of the web page, to add/remove products and/or to reorder products, or perform other edits as further described herein). For example, the user can use the page creation service to review and/or edit a previously generated thematic page.

The user can elect to launch the reviewed/edited thematic page. Launched thematic pages are stored in launched TLP page store 450 (e.g., implemented as a local database, such as using an Apache Cassandra database, or as a cloud-based data store, such as using the commercially available Amazon Simple Storage Service (S3)). For example, the user can select a thematic page and then launch the thematic page (e.g., launching the thematic page can include storing the thematic page in the launched TLP page store, and otherwise, the temporarily created page can be discarded if not selected by the user for launching). As another example, a launched thematic page can be edited using the page editor as similarly described above.

In an example implementation, the page renderer can render a composed thematic page by performing application programming interface (API) calls to the product page store to generate an HTML web page that can be viewed and edited by a user using the page editor. The page renderer can be implemented in Java and Velocity templating languages. For example, the page renderer can download an existing, launched thematic page and replace the title and products with the theme and matching products for the selected theme (e.g., to generate an HTML web page in an iframe and using standard CSS formatting to provide a look-and-feel of existing thematic web pages for the merchant web site including relevant content for the new thematic web page). As another example, the page editor can be used to add a product, remove a product, blacklist a product, modify an order of the products (e.g., using an easy-to-use drag and drop user WYSIWYG interface), etc. In an example implementation, the page editor can be implemented using JavaScript, HTML, and AngularJS.

As another example, a user can use the page editor to perform various other modifications to the thematic page, such as to add HTML or other content (e.g., select a placement and size on the web page, and allow the user to add text/images to the placement on that web page, such as to add a banner to a top of the web page, such as for a promotion for various channels to help drive better conversion, or to add text to improve ranking of the web page, or to add links (programmatically and/or manually) to the web page to other types of web pages and to improve the discoverability of other content on the web site). In some cases, thematic pages (e.g., thematic web pages) can include dynamic left nav (navigation) that can link to other thematic pages (e.g., other related/similar thematic web pages). For example, the dynamic left nav can also be edited by a user using the page editor. In some cases, thematic pages can support pagination or infinite scroll to support a greater number of products (e.g., matching products to the theme of that thematic page, such as greater than 32 products presented on a given thematic page).

For example, launched thematic pages can be published and can be crawled and indexed by Internet search engines (e.g., such that the thematic pages are searchable using Internet search engines), such as an Internet search engine provided by a third party web server 454. Assume that a new thematic page for the theme of "black leather shoes" is launched for the ACME.com merchant web site and indexed by an Internet search engine accessible via the third party web server. If a user is browsing the WWW using a web browser 452 and searches for "black leather shoes" using the Internet search engine provided by the third party web server, then an organic search result may return a result/link for this new thematic page for the ACME.com merchant web site provided by a subscribing web server 456 (e.g., an example link for this new thematic page for ACME.com can be th.ACME.com/EXAMPLE-THEMATIC-LANDING-PAGE-1). If the user selects the link for this new thematic page for the ACME.com merchant web site in the search results, then the user's web browser will be directed to, in this example, subscribing web server 456, which corresponds to a web server for ACME.com in this example. The link in this example will be resolved by (e.g., the local domain name system (DNS) server of the subscribing merchant web server domain) the thematic landing pages system web domain, and the HTTP request for this new thematic web page is redirected to the thematic landing pages system as shown. A TLP display subsystem 476 can receive and process the request for this new thematic web page by retrieving the requested web page from the launched TLP page store (e.g., fetching the stored web page associated with th.ACME.com/EXAMPLE-THEMATIC-LANDING-PAGE-1). The retrieved thematic page is returned to the web browser and presented to the user.

As another example, launched thematic pages can be presented on one or more web pages of the subscribing merchant web site (e.g., ACME.com) by using a related products and/or related searches widget (e.g., including a related search for "black leather shoes" that if clicked on/selected by a user, would be accessible via the example link of th.ACME.com/EXAMPLE-THEMATIC-LANDING-PAGE-1, such as similarly described above).

As also shown, a TLP API layer 474 is in communication with a data storage layer 460 that includes a backend data store 462. As shown, subscribing web server 456 is in communication with data storage layer 460 via a merchant/web server data feed and pixel data 458 (e.g., to provide merchant/web server data and pixel/user behavior data associated with a subscribing web site, such as described herein). For example, backend data store 462 can be implemented using a SOLR data cluster that is optimized for throughput, which can store merchant web site data, merchant data feed(s), user context/behavioral data on a merchant web site, and/or other data sources, including performance analytics data received from a performance analytics component 472. As shown, data storage layer 460 also includes a frontend data store 464. For example, frontend data store 464 can be implemented using a SOLR data cluster optimized for latency, which can store merchant web site data, merchant data feed(s), user context/behavioral data on a merchant web site, and/or other data sources, including performance analytics data received from performance analytics component 472.

Various components and services of the thematic landing pages system are in communication with data storage layer 460 (e.g., to access/retrieve data stored in the data storage layer, such as fetched merchant web data, merchant product catalog data, merchant behavior data, etc.), including, for example, theme suggestion service 416 and product page store 428 as shown. In an example implementation, data storage layer 460 includes support for one or more programmatic interfaces/APIs for accessing data stored in, for example, frontend data store 464, and such APIs can be called via TLP API layer 474 as shown (e.g., page composer can call such APIs to rank products, search for products/product related data, and/or retrieve OOS/pricing updates). As shown, data storage layer 460 includes a ranking Application Programming Interface (API) 466 (e.g., for performing various product/service rankings based on various criteria, which can be used to rank matching products for thematic landing pages using various techniques described herein), a store API 468 (e.g., for requesting various merchant data such as product data for each subscribing merchant web site processed from each merchant's product catalog and/or scraped from each merchant's web site in order to provide a product name, product ID, image, text description, and/or other information for the merchant/product store, which can be used to implement various thematic landing pages techniques as described herein, and which can be used to populate/update data stored in product page store 428), and an Out-Of-Stock (OOS)/Pricing API 470 (e.g., to provide OOS status and/or pricing information for each product in a subscribing merchant product catalog/merchant web site, which can be used to implement various thematic landing pages techniques as described herein).

In one embodiment, TLP admin interface 410 provides a dashboard that can also provide performance metrics for thematic landing pages, for the subscribing merchant web site. For example, the performance analytics component can provide various thematic landing pages related performance data as input for storing in the data storage layer. In some cases, the performance analytics component can perform data analytics on thematic landing pages, such as to determine and report on various aspects of such performance of thematic landing pages for a subscribing merchant web site (e.g., RPV, ATC, revenue, top-performing web pages, underperforming web pages, etc.) of different thematic landing pages. As another example, the performance analytics can perform data analytics to determine which specific content (e.g., specific products, text, or images) positively influenced the overall performance of a thematic landing page.

In one embodiment, data storage layer 460 is a high-availability storage layer, horizontally scalable, supports primary key look-up of product/service merchant product information, supports searches by various attributes of a document (e.g., a web page), and provides a reliable and fast data storage layer infrastructure. In one embodiment, the data storage layer includes a highly available, fault tolerant, and horizontally scalable key-value storage solution. Example storage solutions that can be used for implementing such a data storage layer include the following commercially available, open source storage solutions: Apache Cassandra, Apache HBase, BerkeleyDB, and LevelDB. As will now be apparent to one of ordinary skill in the art, various other commercially available and/or open source storage solutions can similarly be used to implement the data storage layer.

As similarly discussed above, the input for processing by the back-end includes the merchant data feed. In one embodiment, the topology for the data storage layer includes a back-end cluster and a front-end cluster as shown, which each include a search index (e.g., implemented using Apache SolrCloud or another indexing framework/platform, facilitating look-up by attribute/reverse index lookup, such as similarly described above) and a data store (e.g., implemented using Cassandra or another data store, facilitating primary key look-up, such as similarly described above).

In one embodiment, data storage layer 460 is implemented using cloud/remote computing services, such as provided by various cloud computing service providers (e.g., Amazon, HP, IBM, and other companies offer such commercially available cloud computing services). For example, the data storage layer can be implemented using Amazon Web Services (AWS) for data storage and computing purposes performed by the data storage layer as described herein. Various AWS instance types that can be used to implement the data storage layer are further described below.

For example, Amazon Elastic Compute Cloud® (EC2) is a commercially available cloud computing service from Amazon that can be used to implement the data storage layer for compute purposes. Amazon EC2 is hosted in multiple locations worldwide. These locations are generally composed of regions and availability zones. Each region is typically a separate geographic area. Each region typically has multiple, isolated locations known as availability zones.

In an example implementation, the data storage layer described herein includes a dedicated Cassandra cluster(s). For example, dedicated Cassandra clusters can be implemented using the following example hardware environment: 60×i2.xlarge (e.g., across three availability zones in US-East-1 region), 12×i2.xlarge (e.g., across three availability zones in US-West-1 region), and 6×i2.xlarge (e.g., across three availability zones in EU-West-1 region).

In an example implementation, the data storage layer described herein also includes a dedicated SolrCloud cluster(s). For example, dedicated SolrCloud clusters can be implemented using the following example hardware environment: 12×r3.2xlarge (e.g., across three availability zones in US-East-1 region), 6×r3.2xlarge (e.g., across three availability zones in US-West-1 region), and 6×r3.2xlarge (e.g., across three availability zones in EU-West-1 region).

As will now be apparent to one of ordinary skill in the art, various other hardware environments and/or cloud service providers can be used to efficiently and effectively implement the data storage layer to perform the various techniques disclosed herein. As another example, a data storage layer provider can implement the data storage layer using hardware in its own data center(s) and/or using a combination of hardware in its own data center(s) and one or more cloud service providers.

Activity Diagram for the Thematic Landing Pages System

Figure 5:
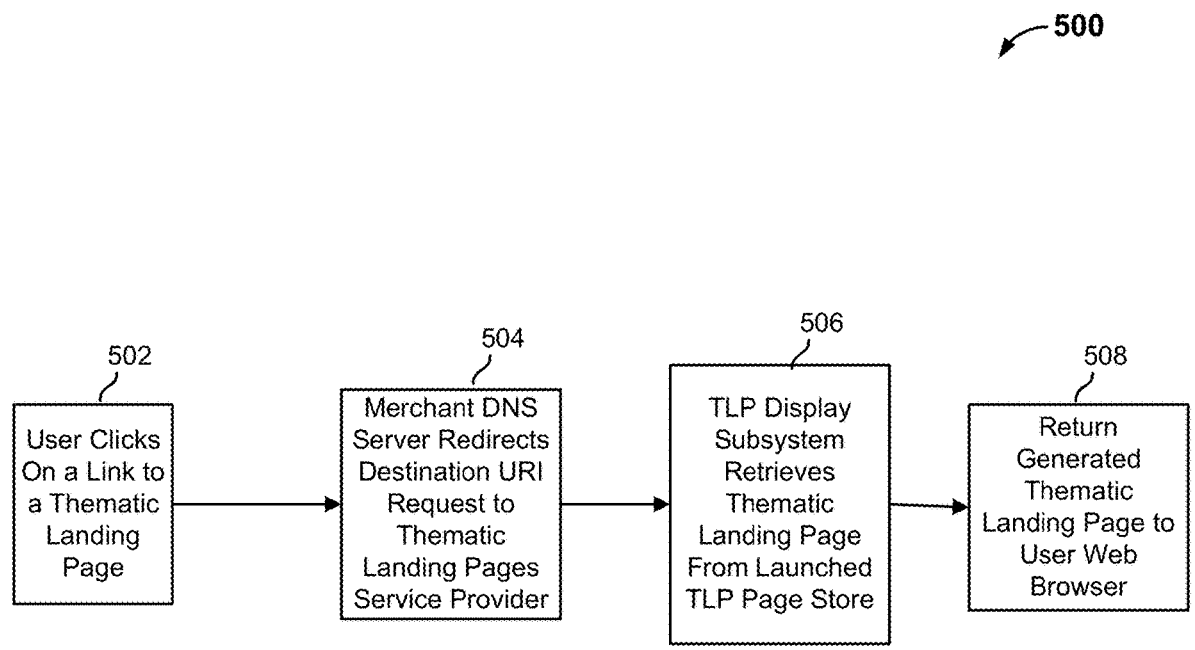
FIG. 5 is a functional block diagram illustrating an activity diagram of the thematic landing pages system in accordance with some embodiments.

FIG. 5 is a functional block diagram illustrating an activity diagram of the thematic landing pages system in accordance with some embodiments. As shown in FIG. 5, an example use case for providing thematic landing pages is performed for an online marketing/ad campaign for a merchant web site (e.g., an e-commerce web site) to provide a thematic landing page for the merchant web site, which can be implemented using the system and techniques described above. In one embodiment, the activity diagram 500 of FIG. 5 is performed by a thematic landing pages system/service, such as described above with respect to FIGS. 1-4.

Referring to FIG. 5, at 502, a user clicks on a link to a thematic landing page. For example, the link can be in an organic search result or an ad link.

At 504, a merchant DNS server redirects a destination URI request to a thematic landing pages service provider. For example, the merchant is a subscriber to the thematic landing pages service provided by the thematic landing pages service provider.

At 506, a TLP display subsystem of the thematic landing pages service provider retrieves the thematic landing page from a launched TLP page store.

At 508, the generated thematic landing page is returned to the user web browser executed on the user's client/computing device for display to the user.

Matching User Intent with a Theme

For example, the user intent can be represented as a user query. In one embodiment, after the user inputs a query (e.g., user query 412) for what themes the user wants to generate, the TLP system expands the query to themes using two approaches as described below.

As a first approach, the TLP system (e.g., theme suggester 414) generates themes from different permutations and combinations of attributes and products that are identified from a user's query. For example, if a user enters a query "red ruffle dress," the TLP system can first identify that "dress" is a product and that "red" and "ruffle" are attributes of this product. Then, the TLP system can generate three themes, "red dress," "ruffle dress," and "red ruffle dress."

Second, the TLP system (e.g., theme suggester 414) generates themes by searching a user's query against candidate themes (e.g., candidate theme index 422). The candidate themes are generated using a theme generation process as well as all the user queries that can be collected from the Internet (e.g., using search query logs of subscribing merchant web sites, provided via Internet query index 418). For example, if a user entered the theme name "red dress," the TLP system can perform a search on the existing suggested themes and return, for example, up to ten of the closest matching themes that contain the words "red dress."

Matching Products for a Given Theme

As discussed above, in some implementations, a product Solr index (e.g., product page index 430) is generated for e-commerce merchant inventory, which can index different attributes of the products, and the product types of products. For example, a product "red lace dress" can be indexed as three fields in Solr, color "red," material "lace," and product "dress." Given a theme, the TLP system (e.g., product matcher 426) can convert the theme to a Solr query for finding the matching products from the Solr index using various techniques, such as described below.

First, the TLP system can convert a given theme to a structured query, and then find matching products with these attribute terms and product terms. A structured query of a theme indicates that each term in the theme can be identified to be either an attribute or a product. As an example theme of "red dress," the TLP system can automatically identify that "red" is a color term, and that "dress" is a product term. Then, the TLP system can compose a Solr query of "color:

red AND product:dress" to find matching products from the product Solr index for this e-commerce merchant.

Second, the TLP system can convert a given theme to a tier-1 relaxation query. A tier-1 relaxation query indicates that some terms in a given theme cannot be identified as either an attribute or a product. In this case, the TLP system can use keyword matching against these terms. As an example theme of "red lovely dress," assume that the TLP system cannot identify "lovely" to be either an attribute or a product. Then, in this example, the TLP system can compose a Solr query of "color:red AND product:dress AND keyword:lovely" to find matching products from the product Solr index for this e-commerce merchant.

Different Scoring Algorithms

In some embodiments, various different scoring algorithms can be applied for measuring the quality of a thematic page and across thematic pages generated for a merchant web site. In an example implementation, the page composer (e.g., page composer 436) can implement various scoring algorithms, such as disclosed herein, to generate thematic landing pages that meet a threshold quality criteria, such as ensuring that sufficient content is present on the generated thematic page, avoiding duplicate content (e.g., to avoid generating duplicate landing pages), and/or other quality criteria as described herein (e.g., and, in some cases, the thematic page quality can be periodically checked for thematic pages to maintain thematic page quality over time, and to discard or flag low quality thematic pages, such as described herein). For example, four scoring algorithms are described below that can be used to measure the quality of a page and across pages.

Content Score

In one embodiment, a content score measures the quality of the content of a thematic page, including the theme, title, and description of a page. In an example implementation, the content score of a thematic page with multiple products can be computed as follows.

A theme and product title are composed by a list of words. Assume that the stemmed term set of a theme, Q, and the stemmed term set of a product title, T, can be denoted by Q, $T_1, \ldots, T_n$.

The stemmed bigrams of the query Q and title T can be denoted by QB, $TB_1, \ldots, TB_n$.

For each element $q_j$ in Q, define its frequency as follows:

$$F_q = \sum_{i=1}^{n} i(q, T_i)$$

where $I(q, T_i)=1$ if $q \in T_i$ and $I(q, T_i)=0$ if $q \notin T_i$

Similarly, for each element qb in QB, define its frequency as follows:

$$F_{qb} = \sum_{i=1}^{n} i(qb, TB_i)$$

Define the score of q, $S_q$, and the score of bigram qb, $S_{qb}$, as follows:

$$S_q = \frac{3 \times F_q}{3 + F_q}$$

$$S_{qb} = \frac{3 \times F_{qb}}{3 + F_{qb}}$$

Define the score of Q, $S_Q$, and the score of QB, $S_{QB}$ as follows:

$$S_Q = \sum_{q \in Q} S_q$$

$$S_{QB} = \sum_{qb \in QB} S_{QB}$$

The query score S can be defined as follows:

$$S = \frac{5 \times S_Q/(|Q|+0.001)}{5 - S_Q/(|Q|+0.001)} + \frac{5 \times S_{QB}/(|QB|+0.001)}{5 - S_{QB}/(|QB|+0.001)}$$

The minimum value of S is
$S_{min} = 0$
when for any q and qb, $F_q = 0$ and $F_{qb} = 0$.

$$S_{max} = \frac{5 \times \frac{3 \times n}{3+n} \times \frac{|Q|}{|Q|+0.001}}{5 - \frac{3 \times n}{3+n} \times \frac{|Q|}{|Q|+0.001}} + \frac{5 \times \frac{3 \times n}{3+n} \times \frac{|QB|}{|QB|+0.001}}{5 - \frac{3 \times n}{3+n} \times \frac{|QB|}{|QB|+0.001}} \approx \frac{30 \times n}{15 + 2 \times n}$$

when for any q and qb, $F_p = n$ and $T_{qb} = n$.
Normalization of the content score is shown below.

$$S_{normal} = \frac{S}{S_{max}}$$

Uniqueness Score

In one embodiment, a uniqueness score measures how unique a set of products on the thematic page is versus other thematic pages. In an example implementation, the uniqueness score of a set of products on a thematic page versus other thematic pages can be computed as follows.

Consider pages T1, T2, and T3, and products P1, P2, and P3. Let "X" denote whether the product appears on the page.

|    | P1 | P2 | P3 |
|----|----|----|----|
| T1 | X  | X  |    |
| T2 |    | X  | X  |
| T3 | X  | X  |    |

Assume that all pages are equally important. Then, compute a percentage of a product Pi, Pi_s, that appears on a page.

*Pi_s*=1/(number of pages that contain *Pi*)

Then, the following numbers are determined for P1, P2, and P3.
P1_s=½
P2_s=⅓
P3_s=1
Taking P1 as an example, ½ means that ½ of P1 appears on T1, and the other ½ of P1 appears on T3.

Next, compute the uniqueness score of a page Ti, Ti_uniq, by summing the percentages of all products on this page. To normalize this score, further divide this score by the number of products on this page.

$$Ti\_uniq=sum(Pi\_s)/(\text{number of products on } Ti)$$

Based on this equation, the following results are generated:

T1_uniq=(½+⅓+0)/2=5/12
T2_uniq=(0+⅓+1)/2=⅔
T3_uniq=(½+⅓+0)/2=5/12
Ti_uniq is in the range of [0, 1].
Ti_uniq=0 if and only if no products on Ti.
Ti_uniq=1 if and only if all products on Ti do not appear on any other pages.

Flux Score

In one embodiment, a flux score measures the variation of the products on a thematic page for a given period. In an example implementation, the flux score of the variation of the products on a page for a given period can be computed as follows. First, compute the two day variation of the products on a page by using symmetric difference divided by the union of products in these two days, D1 and D2.

$$Ti\_flux\_\{D1 \text{ to } D2\}=\text{symmetricDifference}(Ti\_\{D1\}, Ti\_\{D2\})/\text{union}(Ti\_\{D1\},Ti\_\{D2\})$$

Then, compute the average difference of Ti for all consecutive pairs of days for a given period, for example, 30 days.

$$=(Ti\_flux\_\{D1 \text{ to } D2\}+Ti\_flux\_\{D2 \text{ to } D3\}+\ldots+Ti\_flux\_\{D29 \text{ to } D30\})/(30-1)$$

Duplication Score

In one embodiment, a duplication score measures how much overlapping there is between a thematic page and its most similar page. In an example implementation, the duplication score of how much overlapping between a page and its most similar page can be computed as follows.

For example, the overlapping can be measured by the percentage of same products on these two pages for the given page. Consider a page T and its most similar page T̂. The duplication score for T, $S_{dup}(T)$ can be computed as follows. This is the Jaccard similarity coefficient.

$$S_{dup}(T) = \frac{|T \cap \hat{T}|}{|T \cup \hat{T}|}$$

For example, suppose T has products $P_1, P_2, P_3$ and T̂ has products $P_1, P_2, P_3, P_4$. $S_{dup}(T)$ is 75%.

For simplicity, this example only considers the first four products of T and T̂ for its duplication score.

User Interface of the TLP System

In some embodiments, the TLP system includes a user interface that facilitates an easy to use graphical user interface (GUI) that allows users an intuitive mechanism to add, remove, and lock the products, and/or to perform various other edits to customize thematic landing pages that were generated using the TLP system.

In one embodiment, the page creation service includes the editor and the renderer, such as similarly described above with respect to FIG. 4. In an example implementation, the page creation service also includes a template store, a widget store, a page store, and a container, which are each further described below.

For example, a container is a reusable component that can include a location definition in a class path or x-path, a container HTML definition such as the dimensions, and the merchant to which the container belongs. An example container can be inserted after the h1 in the web page (e.g., insert after ".h1"), and the dimensions of the container can be specified such as follows: <p style=width:100px; height: 100px></p>.

For example, a template is a reusable component that can include a HandleBar template, which can specify a look-and-feel of the widget and a parameterization schema. An example Handlebar template (e.g., <div>{{data.title}}</div>) can include the following example parameterization schema: {name: "title", type: "string" }.

A widget can include a container, a template, and data. A page can include a URL and widgets (e.g., to specify what widgets are associated with the URL). In some cases, this is the simplest kind of rule for URL→widget. More abstractly, this is a simple implementation of a service, which given a URL, can return a list of widgets associated with that URL. In another example implementation, the Page model can support additional and/or more complex rules, or delegate this task to multiple other services.

An example flow for the page creation service is now described. The editor can retrieve and update templates and containers to manage reusable components. The editor can retrieve and update widgets and pages to manage actual widgets on thematic pages. A renderer can generate the location and widget HTML given a URL. The editor (e.g., and a backend pipeline) can use the renderer to insert HTML content into a specific HTML content location defined in the container.

In some implementations, the TLP system includes a dashboard application for generating pages using the TLP system, such as similarly described above with respect to FIG. 4. For example, a web application can be hosted on a merchant's web site to preview and enable rich user interactions, such as editing texts, adding products, removing products, and/or locking products. For example, this web application can be loaded via an iFrame in a web browser, display a thematic page, and communicate with a main TLP (Thematic Landing Page) dashboard app of the TLP system to modify merchants' thematic pages (e.g., newly generated and/or previously generated/launched). The actual data modification and communication with the front-end server can be performed from a dashboard app to ensure data security.

In one embodiment, a plurality of different thematic landing pages can be generated (e.g., and such thematic pages can also be edited using the WYSIWYG interface of the page creation service, such as described above and further below), such as further described below with respect to FIG. 6.

Figure 6:
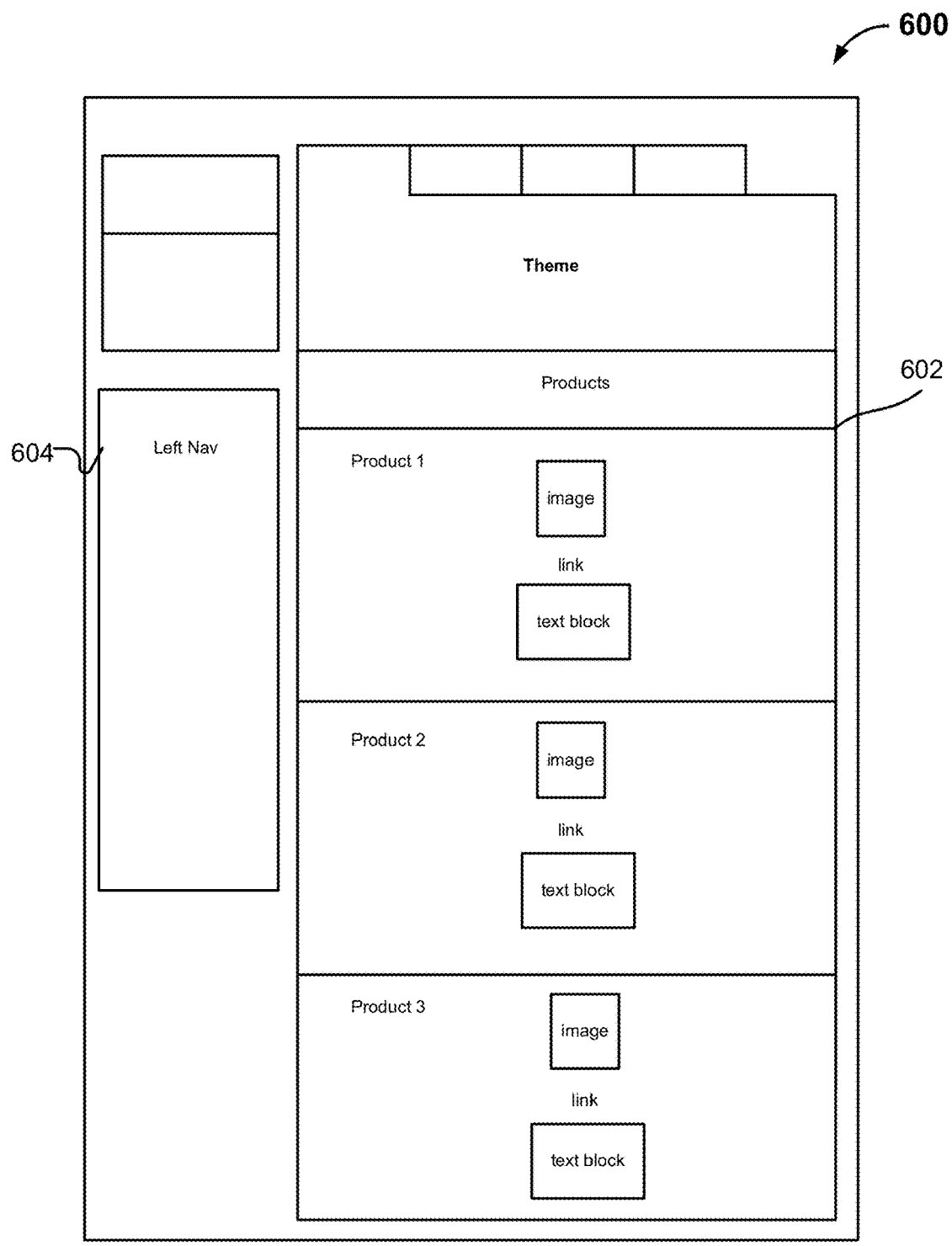
FIG. 6 illustrates an example thematic landing page generated using the disclosed techniques in accordance with some embodiments.

FIG. 6 illustrates an example thematic landing page generated using the disclosed techniques in accordance with some embodiments. In various embodiments, content (e.g., content relevant to a theme, including, for example, images, texts, links such as URL/URI links, and/or other static web page content) can be published on a thematic landing page in any appropriate manner.

Referring to FIG. 6, a generated thematic page is provided as a thematic landing page 600. In this example, the thematic page displays products relevant to the theme as shown at 602. For example, a list of products that match (e.g., based on content relevancy) the theme, shown as the title of the thematic page, can be presented on the thematic landing page as shown. A left nav 604 is also provided as shown. In an example implementation, a left nav (navigation) can link to other thematic pages (e.g., other related/similar thematic web pages).

The example thematic landing page of FIG. 6 illustrates just one example of different thematic landing pages. As will now be apparent, various other forms and customized versions of thematic landing pages can be configured using the disclosed techniques. For example, thematic landing pages can be customized for improving searchability of a merchant's web site, improving conversion rates for a given channel, and/or other SEO related improvements of web services for a merchant by creating and customizing new thematic web pages (e.g., using a "look and feel" of the existing merchant web pages), to promote certain products and/or brands associated with the targeted online ad campaigns, to insert banners on the thematic landing page, etc. These and other examples of thematic landing pages for improving e-commerce web sites and for editing thematic landing pages will now be further described below.

Figure 7:
FIG. 7 illustrates a curate tab of an editor of a thematic landing pages system for editing thematic landing pages generated using the disclosed techniques in accordance with some embodiments.

FIG. 7 illustrates a curate tab of an editor of a thematic landing pages system for editing thematic landing pages generated using the disclosed techniques in accordance with some embodiments. Referring to thematic landing page 700 of FIG. 7, a curate tab 702 allows users of the editor of the thematic landing pages system to modify the title and header of a thematic page. For example, a user can modify the <title> tag and the header within the editor, and the user can then view any such modifications directly on the page preview of the editor. The editor also allows users to search for, add, remove, lock and reorder products, such as shown in FIG. 8 and discussed below.

Figure 8:
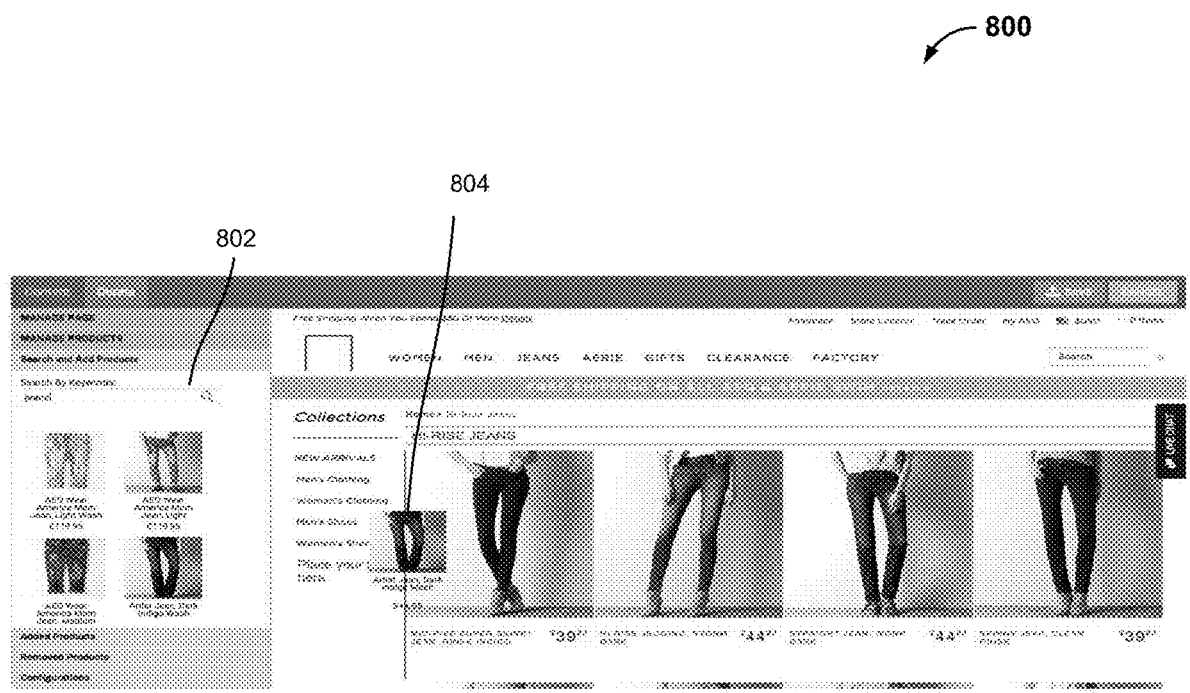
FIG. 8 illustrates a search for products using an editor of a thematic landing pages system for editing thematic landing pages generated using the disclosed techniques in accordance with some embodiments.

FIG. 8 illustrates a search for products using an editor of a thematic landing pages system for editing thematic landing pages generated using the disclosed techniques in accordance with some embodiments. Referring to thematic landing page 800 of FIG. 8, a search box 802 allows users of the editor of the thematic landing pages system to search for products that can be added to a thematic page. For example, a user can search for products by entering a keyword query in the search box (e.g., jeans), select a product search result (e.g., multiple products can be returned in the search results, such as four products as shown in this example), and add the selected product result by dragging and dropping the selected product search result onto the thematic page. Other search options can include searches for the following (e.g., as applicable): SKU of product (e.g., which would typically return a single matching product); a URL of the product (e.g., which would typically return a single matching product); and/or a title of the product (e.g., which would typically return a single matching product). In an example implementation, the user can select a product search result to add to the thematic page by clicking, holding, and dragging the selected product search result, such as shown at 804. When the user drags the product and hovers over where they would like to add the selected product search result, the editor can show a line that indicates where the product would be positioned on the web page if the previewed operation is performed. After the user releases the mouse click, the selected product search result will automatically drop and appear in that position on the web page so that the user can preview how it looks after the modification. In some cases, the editor can obtain any needed information to display a product, such as a product image, heading, cost, URL from the dashboard app of the TLP system, make a copy of one of the products in the existing products, and create a new product to insert in the editing web app.

Figure 9:
FIG. 9 illustrates an example of removing products using an editor of a thematic landing pages system for editing thematic landing pages generated using the disclosed techniques in accordance with some embodiments.

FIG. 9 illustrates an example of removing products using an editor of a thematic landing pages system for editing thematic landing pages generated using the disclosed techniques in accordance with some embodiments. Referring to thematic landing page 900 of FIG. 9, a user of the editor of the thematic landing pages system can remove products from a thematic page as shown at 902. For example, a user can select a product to remove as follows. On a preview section of the edit pop-up, the user can scroll through the thematic page to view all the products. If the user finds a product that the user wants to remove, then the user can perform the following using the dashboard app to remove the product. The user can use a mouse to hover over the product. Upon hovering over the product, an overlay can appear over the product that will show a way to remove the product. In an example implementation, the overlay can be displayed as an "X." The user can then click on the "X" to remove the product from the thematic page.

Figure 10:
FIG. 10 illustrates a configurations tab for locking and/or refreshing products using an editor of a thematic landing pages system for editing thematic landing pages generated using the disclosed techniques in accordance with some embodiments.

FIG. 10 illustrates a configurations tab for locking and/or refreshing products using an editor of a thematic landing pages system for editing thematic landing pages generated using the disclosed techniques in accordance with some embodiments. Referring to thematic landing page 1000 of FIG. 10, a configurations tab 1002 allows a user to lock products, such as described below. For example, depending on the types of actions a user performs, the TLP system can implement different ordering rules to accommodate for auto refreshing, locking, and/or backfilling of products on thematic pages. For example, the TLP system can implement this using a locking feature. In the configurations section, the user can select if they want all products locked in the current order they are in or X number of products to be locked (e.g., ranging from 0 to the total number of products on the page, such as 8 products can be configured to be locked as shown in this example). In an example implementation, the locking mechanism can be implemented as follows. If all products locked is the configuration setting for locking, then upon saving, this configuration setting will lock the order set of all products on the thematic page and will not refresh the product set if new products come in stock that match the theme of the thematic page (e.g., in this example, the TLP system would not backfill the page with any products). If zero products locked is the configuration setting for locking (e.g., in some cases, this can be a default configuration setting for product locking), then this setting will refresh the thematic page normally and order the products based on relevance (e.g., using this configuration setting allows for backfilling by the TLP system of the entire page). If one to X number of products locked is the configuration setting for locking, then upon saving, this configuration setting will lock the X number of products on the thematic page and then attempt to fill out the rest of the page until a maximum number of products allowed on the thematic page is reached.

Figure 11:
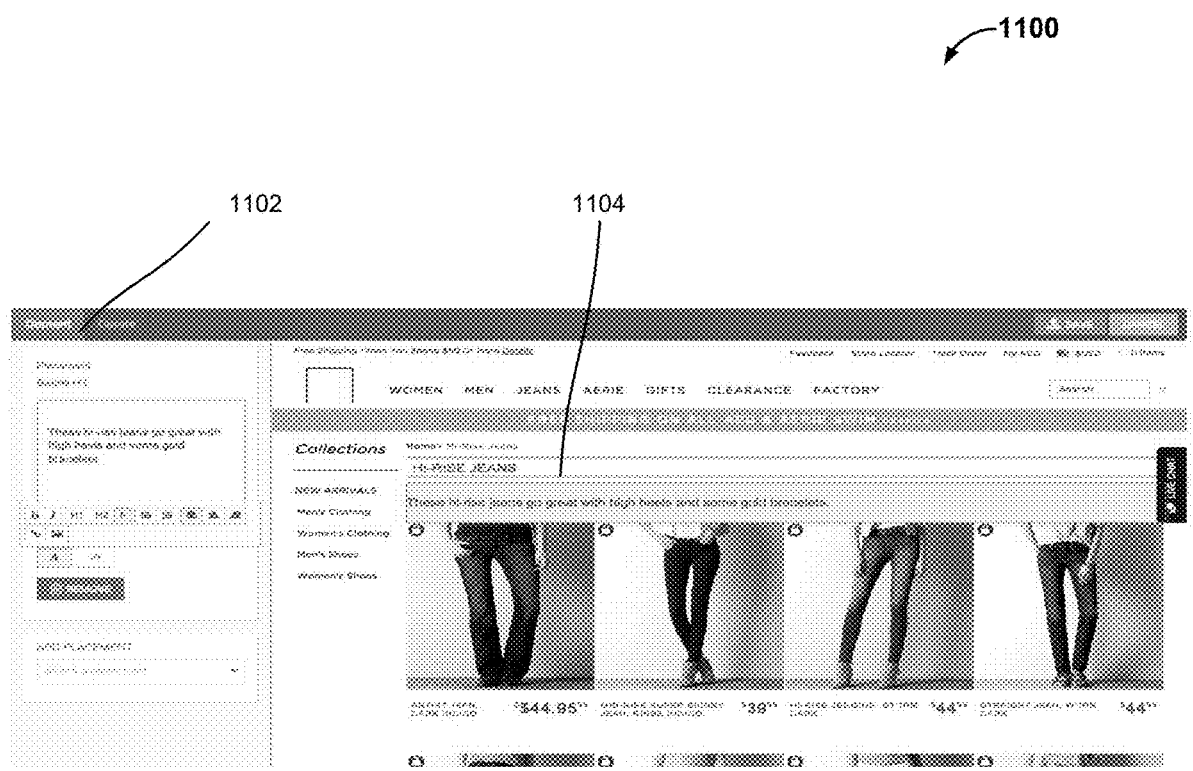
FIG. 11 illustrates a content tab for editing content using an editor of a thematic landing pages system for editing thematic landing pages generated using the disclosed techniques in accordance with some embodiments.

FIG. 11 illustrates a content tab for editing content using an editor of a thematic landing pages system for editing thematic landing pages generated using the disclosed techniques in accordance with some embodiments. Referring to thematic landing page 1100 of FIG. 11, a content tab 1102 allows a user to add HTML content to a thematic page as well as create new HTML placements to add content, such as to add text to the page as shown at 1104. For example, the adding HTML feature allows users to add content to a thematic page (e.g., including text, images, video, and/or other content). This content can be used to drive better engagement with users on the page, help drive more visits from organic search, and/or increase conversion.

Figure 12:
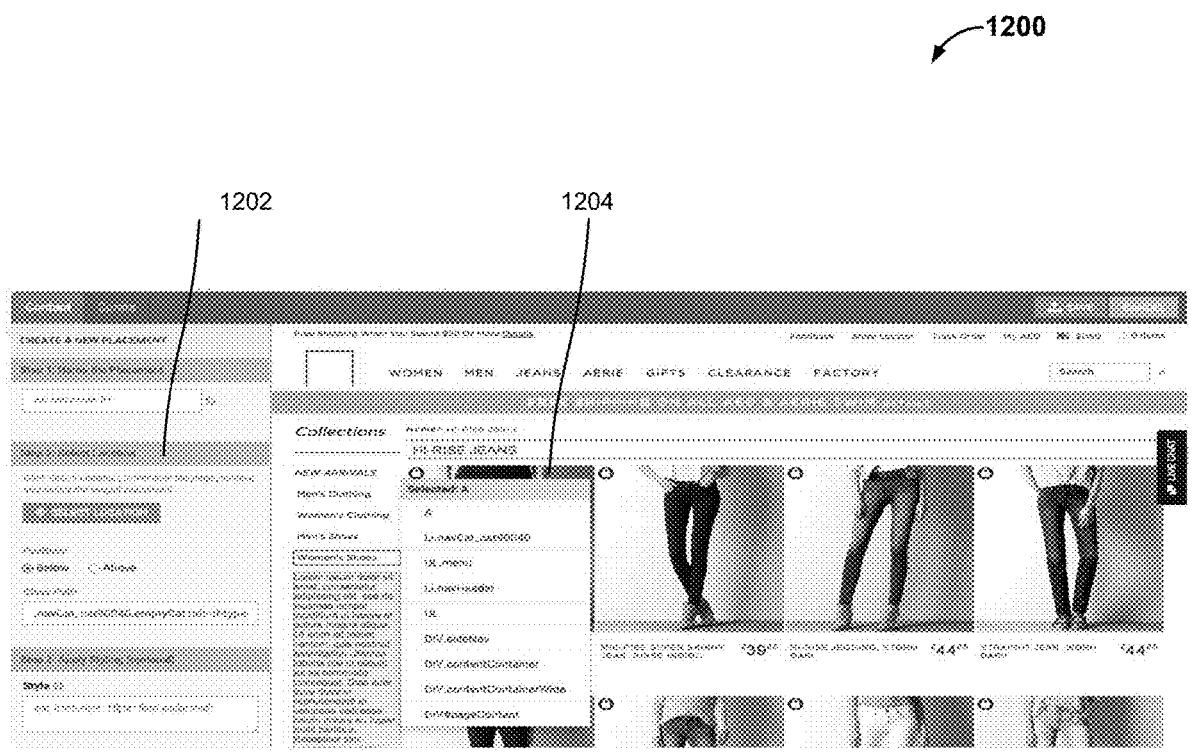
FIG. 12 illustrates a new content placement tab for editing content using an editor of a thematic landing pages system for editing thematic landing pages generated using the disclosed techniques in accordance with some embodiments.

FIG. 12 illustrates a new content placement tab for editing content using an editor of a thematic landing pages system for editing thematic landing pages generated using the disclosed techniques in accordance with some embodiments. Referring to thematic landing page 1200 of FIG. 12, a new content placement tab 1202 allows a user to add HTML content with a user specified placement on a thematic page as well as create new HTML placements to add content, such as shown at 1204. In an example implementation, the HTML feature allows users to: create saved placements so they can use them across all thematic pages; select the location that they wish to have this placement from a preview screen (e.g., effectively selecting which "div" location that they would like to inject this new text); select these placements from a drop down menu once they are saved; and apply styling attributes to these saved placements (e.g., font size, color, padding, and/or various other styling attributes) so that users do not need to enter this into every thematic page.

Example Processes for Web Sites Providing Thematic Landing Pages

Figure 13:
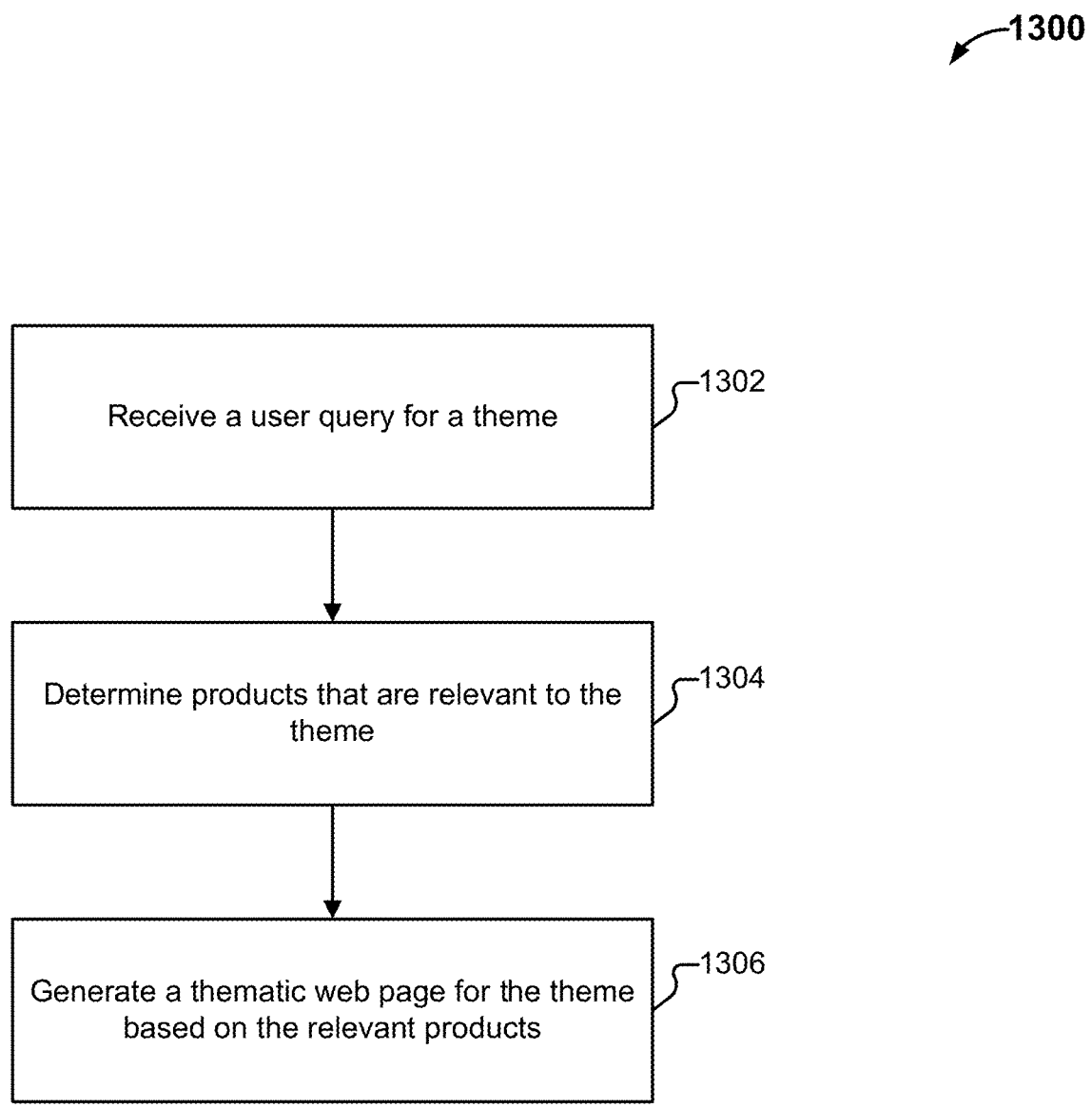
FIG. 13 is a flow diagram illustrating a process for providing thematic landing pages in accordance with some embodiments.

FIG. 13 is a flow diagram illustrating a process for providing thematic landing pages in accordance with some embodiments. In one embodiment, a process 1300 is performed by a thematic landing pages system, such as described above with respect to FIGS. 1-5.

The process begins at 1302. At 1302, a user query for a theme is received. For example, an admin interface can allow a user to enter a keyword search for a theme for a subscribing merchant web site.

At 1304, products that are relevant to a given theme are determined. For example, a product matcher engine can determine whether one or more products provided by the merchant web site are relevant to the given theme based on a content relevancy.

At 1306, the thematic landing page is generated for the theme based on the relevant products. For example, a page composer engine can generate the thematic page.

Figure 14:
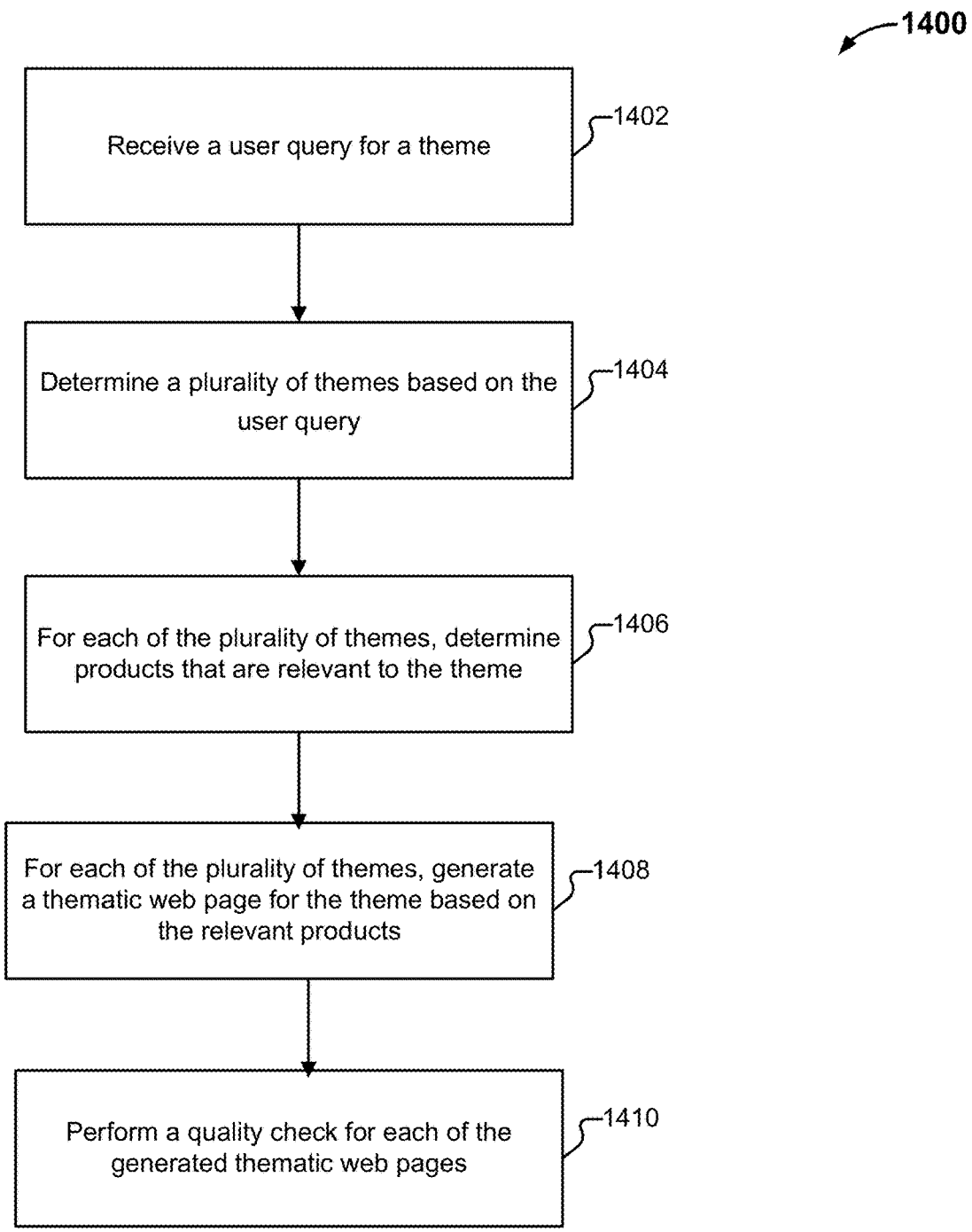
FIG. 14 is another flow diagram illustrating a process for providing thematic landing pages in accordance with some embodiments.

FIG. 14 is another flow diagram illustrating a process for providing thematic landing pages in accordance with some embodiments. In one embodiment, a process 1400 is performed by a thematic landing pages system, such as described above with respect to FIGS. 1-5.

The process begins at 1402. At 1402, a user query for a theme is received. For example, an admin interface can allow a user to enter a keyword search for a theme for a subscribing merchant web site.

At 1404, a plurality of themes based on the user query is determined. For example, a theme suggester engine can determine a plurality of themes based on the user query.

At 1406, for each of the plurality of themes, products that are relevant to a given theme are determined. For example, a product matcher engine can determine whether one or more products provided by the merchant web site are relevant to the given theme based on a content relevancy.

At 1408, for each of the plurality of themes, the thematic landing page is generated for the theme based on the relevant products. For example, a page composer engine can generate thematic pages for each of the plurality of themes.

At 1410, a quality check for each of the generated thematic landing pages is performed. For example, the page composer engine can perform a content quality check on each of the generated thematic pages using various techniques disclosed herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for customizing thematic landing pages using a thematic landing pages service, comprising:
a processor; and
a memory coupled with the processor, wherein the memory is configured to provide the processor with instructions which when executed cause the processor to:
receive, from at least one computing device of a user, a user query for a theme corresponding to content on a merchant web site of a merchant who subscribes to the thematic landing pages service that allows the user to customize a thematic landing page, comprising to:
generate a first theme based on various permutations and combinations of attributes and products identified from the user query; or
generate a second theme, comprising to:
compare the user query with a plurality of candidate themes; and
select a candidate theme closest matching the user query;
determine products that are relevant to the theme, comprising to:
A) convert the theme to a structured query, the structured query including an attribute term, a product term or both; and
find a product relating to the attribute term, the product term or both; or
B) convert the theme to a relaxation query, the relaxation query indicating that a term in the theme cannot be identified as either an attribute or a product; and
in response to a user accessing a user's website, automatically generate a thematic landing page at a page composer configured to populate content on the thematic landing page using matching products for a selected theme, call a ranking application programming interface (API) via a thematic landing page ALP layer to at least one of rank products, search for products, search for product related data, or retrieve out-of-stock pricing updates, and communicate a generated thematic landing page to a thematic page store configured to index the generated thematic landing page and communicate the generated or stored thematic landing page to be displayed using a display of the at least one computing device of the user and under the control of the processor, for the theme based on the relevant products, comprising to:
perform one or more of the following:
A) determine whether a generated thematic landing page has sufficient content or includes duplicate content based on a content quality of a generated thematic landing page based on a thin content score determined using a bigram of a first word of the user query and a second word of the theme, a title of a product, a description of the thematic landing page, or any combination thereof; and
in response to a determination that the content score is less than or equal to a first threshold, remove the thematic landing page;

B) determine a first percentage of a first relevant product appearing on the thematic landing page based on a number of web pages including the first relevant product;
determine a second percentage of a second relevant product appearing on the thematic landing page based on a number of web pages including the second relevant product;
determine a uniqueness score of the thematic landing page based on a number of relevant products on the thematic landing page, the first percentage of the first relevant product, and the second percentage of the second relevant product; and
in response to a determination that the uniqueness score is less than or equal to a second threshold, remove the thematic landing page; or
C) determine a flux score of the thematic landing page based on a variation of products on the thematic landing page for a first period of time and a second period of time and a union of products on the thematic landing page for the first period of time and the second period of time; and
in response to a determination that the flux score is less than or equal to a third threshold, remove the thematic landing page.

2. The system recited in claim 1, wherein the thematic landing page is associated with a merchant web site, and the relevant products are available via the merchant web site.

3. The system recited in claim 1, wherein the thematic landing page is a web page that is returned in response to a search query.

4. The system recited in claim 1, wherein the thematic landing page is a web page that is presented using a widget on a merchant web site.

5. The system recited in claim 1, wherein the determining of the products that are relevant to the theme, comprises to:
determine the products that are relevant to the theme based on a content relevancy.

6. The system recited in claim 1, wherein the processor is further configured to:
determine one or more themes based on the user query.

7. The system recited in claim 1, wherein the memory is configured to provide the processor with instructions which when executed further cause the processor to:
communicate a generated or stored thematic landing page to a page creation service configured to allow a user to review or edit the generated or stored thematic landing page.

8. The system recited in claim 1, wherein the memory is configured to provide the processor with instructions which when executed further cause the processor to:
communicate a reviewed or edited thematic landing page to a launched thematic landing page store configured to allow a user to select or discard a thematic landing page.

9. The system recited in claim 1, wherein the memory is configured to provide the processor with instructions which when executed further cause the processor to:
render the thematic landing page; and
edit the thematic landing page.

10. The system recited in claim 1, wherein the memory is configured to provide the processor with instructions which when executed further cause the processor to:
edit the thematic landing page, wherein content of the thematic landing page is capable of being edited, when displayed, using a graphical user interface.

11. The system recited in claim 1, wherein the content quality of the thematic page is periodically checked to maintain thematic page quality over time and one of to discard or flag low quality thematic pages.

12. A method of customizing thematic landing pages using a thematic landing pages service, comprising:
receiving, from at least one computing device of a user, a user query for a theme corresponding to content on a merchant web site of a merchant who subscribes to the thematic landing pages service that allows the user to customize a thematic landing page, comprising:
generating a first theme based on various permutations and combinations of attributes and products identified from the user query; or
generating a second theme, comprising to:
comparing the user query with a plurality of candidate themes; and
selecting a candidate theme closest matching the user query;
determining products that are relevant to the theme using a processor, comprising:
A) converting the theme to a structured query, the structured query including an attribute term, a product term or both; and
finding a product relating to the attribute term, the product term or both; or
B) converting the theme to a relaxation query, the relaxation query indicating that a term in the theme cannot be identified as either an attribute or a product; and
in response to a user accessing a user's website, automatically generating a thematic landing page at a page composer configured to populate content on the thematic landing page using matching products for a selected theme, calling a ranking application programming interface (API) via a thematic landing page ALP layer to at least one of rank products, search for products, search for product related data, or retrieve out-of-stock pricing updates, and communicating a generated thematic landing page to a thematic page store configured to index the generated thematic landing page and communicating the generated or stored thematic landing page to be displayed using a display of the at least one computing device of the user and under the control of a processor, for the theme based on the relevant products, comprising:
performing one or more of the following:
A) determining whether a generated thematic landing page has sufficient content or includes duplicate content based on determining a content quality of a generated thematic landing page based on a thin content score determined using a bigram of a first word of the user query and a second word of the theme, a title of a product, a description of the thematic landing page, or any combination thereof; and
in response to a determination that the content score is less than or equal to a first threshold, removing the thematic landing page;
B) determining a first percentage of a first relevant product appearing on the thematic landing page based on a number of web pages including the first relevant product;
determining a second percentage of a second relevant product appearing on the thematic landing page based on a number of web pages including the second relevant product; or determining a uniqueness score of the thematic landing page based on a number of relevant products on the thematic landing page, the first percentage of the first relevant product, and the second percentage of the second relevant product; and in response to a determination that the uniqueness score is less than or equal to a second threshold, removing the thematic landing page; or C) determining a flux score of the thematic landing page based on a variation of products on the thematic landing page for a first period of time and a second period of time and a union of products on the thematic landing page for the first period of time and the second period of time; and in response to a determination that the flux score is less than or equal to a third threshold, removing the thematic landing page.

13. The method of claim 12, wherein the thematic landing page is associated with a merchant web site, and the relevant products are available via the merchant web site.

14. The method of claim 12, wherein the thematic landing page is a web page that is returned in response to a search query.

15. The method of claim 12, wherein the thematic landing page is a web page that is presented using a widget on a merchant web site.

16. The method of claim 12, further comprising:
determining the products that are relevant to the theme based on a content relevancy.

17. A computer program product for customizing thematic landing pages using a thematic landing pages service, the computer program product being embodied in a tangible non-transitory computer readable storage medium and comprising computer instructions for:

receiving, from at least one computing device of a user, a user query for a theme corresponding to content on a merchant web site of a merchant who subscribes to the thematic landing pages service that allows the user to customize a thematic landing page, comprising:

generating a first theme based on various permutations and combinations of attributes and products identified from the user query; or generating a second theme, comprising to:
comparing the user query with a plurality of candidate themes; and
selecting a candidate theme closest matching the user query;

determining products that are relevant to the theme, comprising:

A) converting the theme to a structured query, the structured query including an attribute term, a product term or both; and
finding a product relating to the attribute term, the product term or both; or B) converting the theme to a relaxation query, the relaxation query indicating that a term in the theme cannot be identified as either an attribute or a product; and in response to a user accessing a user's website, automatically generating a thematic landing page at a page composer configured to populate content on the thematic landing page using matching products for a selected theme, calling a ranking application programming interface (API) via a thematic landing page ALP layer to at least one of rank products, search for products, search for product related data, or retrieve out-of-stock pricing updates, and communicating a generated thematic landing page to a thematic page store configured to index the generated thematic landing page and communicating the generated or stored thematic landing page to be displayed using a display of the at least one computing device of the user and under the control of a processor, for the theme based on the relevant products, comprising:

performing one or more of the following:

A) determining whether a generated thematic landing page has sufficient content or includes duplicate content based on determining a content quality of a generated thematic landing page based on a thin content score determined using a bigram of a first word of the user query and a second word of the theme, a title of a product, a description of the thematic landing page, or any combination thereof; and in response to a determination that the content score is less than or equal to a first threshold, removing the thematic landing page;

B) determining a first percentage of a first relevant product appearing on the thematic landing page based on a number of web pages including the first relevant product;

determining a second percentage of a second relevant product appearing on the thematic landing page based on a number of web pages including the second relevant product;

determining a uniqueness score of the thematic landing page based on a number of relevant products on the thematic landing page, the first percentage of the first relevant product, and the second percentage of the second relevant product; and in response to a determination that the uniqueness score is less than or equal to a second threshold, removing the thematic landing page; or C) determining a flux score of the thematic landing page based on a variation of products on the thematic landing page for a first period of time and a second period of time and a union of products on the thematic landing page for the first period of time and the second period of time; and in response to a determination that the flux score is less than or equal to a third threshold, removing the thematic landing page.

18. The computer program product recited in claim 17, wherein the thematic landing page is associated with a merchant web site, and the relevant products are available via the merchant web site.

19. The computer program product recited in claim 17, wherein the thematic landing page is a web page that is returned in response to a search query.

20. The computer program product recited in claim 17, wherein the thematic landing page is a web page that is presented using a widget on a merchant web site.

* * * * *